(12) United States Patent
Tajima

(10) Patent No.: US 11,399,114 B2
(45) Date of Patent: Jul. 26, 2022

(54) INFORMATION PROCESSING APPARATUS AND NON-TRANSITORY COMPUTER READABLE MEDIUM FOR RECOMMENDING A GROUP AS A REGISTRATION DESTINATION FOR INFORMATION BASED ON AN ATTRIBUTE OF THE INFORMATION

(71) Applicant: FUJIFILM BUSINESS INNOVATION CORP., Tokyo (JP)

(72) Inventor: Ryumon Tajima, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 259 days.

(21) Appl. No.: 16/589,691

(22) Filed: Oct. 1, 2019

(65) Prior Publication Data

US 2020/0322502 A1    Oct. 8, 2020

(30) Foreign Application Priority Data

Apr. 4, 2019    (JP) .............................. JP2019-072279

(51) Int. Cl.
| | | |
|---|---|---|
| *H04N 1/00* | (2006.01) | |
| *H04N 1/333* | (2006.01) | |
| *H04N 1/327* | (2006.01) | |
| *H04N 1/32* | (2006.01) | |

(52) U.S. Cl.
CPC ..... *H04N 1/33369* (2013.01); *H04N 1/00214* (2013.01); *H04N 1/32058* (2013.01); *H04N 1/3275* (2013.01); *H04N 1/33338* (2013.01)

(58) Field of Classification Search
CPC ............. H04N 1/33369; H04N 1/3275; H04N 1/00214; H04N 1/33338; H04N 1/32058; H04N 2201/3207; H04N 2201/3208; H04N 2201/3209
USPC ....................................................... 358/1.15
See application file for complete search history.

(56) References Cited

U.S. PATENT DOCUMENTS

| | | | | |
|---|---|---|---|---|
| 6,963,417 | B1 * | 11/2005 | Saito ................... | H04N 1/00214 358/1.15 |
| 2005/0162705 | A1 * | 7/2005 | Kim .................... | H04N 1/00209 358/440 |
| 2007/0043816 | A1 * | 2/2007 | Ishibashi .............. | G06Q 10/107 709/206 |
| 2018/0152569 | A1 * | 5/2018 | Kawashima ....... | H04N 1/00411 |

FOREIGN PATENT DOCUMENTS

JP        2017-112510 A    6/2017

\* cited by examiner

*Primary Examiner* — Kent Yip
(74) *Attorney, Agent, or Firm* — Oliff PLC

(57) ABSTRACT

An information processing apparatus includes a reception unit and a controller. The reception unit receives registration of an address. The controller performs, when the reception unit receives registration of the address, control such that a group having an attribute of the address, among preset groups, is presented as a recommended registration destination for the address.

10 Claims, 16 Drawing Sheets

FIG. 12

| MANAGEMENT NUMBER | GROUP NAME | DEGREE OF ASSOCIATION BASED ON FILTERING ATTRIBUTE | | DEGREE OF ASSOCIATION BASED ON HISTORY INFORMATION | DEGREE OF ASSOCIATION BASED ON FILTERING ATTRIBUTE AND HISTORY INFORMATION |
|---|---|---|---|---|---|
| | | NUMBER OF ADDRESSES | RANK | | |
| 1 | E-MAIL GROUP (TOKYO) | 10 | 1 | 1 | 1 |
| 2 | E-MAIL GROUP (OSAKA) | 1 | 4 | 3 | 3 |
| 3 | E-MAIL GROUP (SENDAI) | 5 | 3 | 2 | 2 |
| 4 | E-MAIL GROUP (FUKUOKA) | 0 | 6 | 4 | 6 |
| 5 | E-MAIL GROUP (KANAGAWA) | 1 | 4 | 5 | 5 |
| 6 | E-MAIL GROUP (NAGOYA) | 7 | 2 | 6 | 4 |
| 7 | E-MAIL GROUP (KYOTO) | 0 | 6 | 7 | 7 |
| 8 | E-MAIL GROUP (SAITAMA) | 0 | 6 | 8 | 8 |

FIG. 14

| MANAGEMENT NUMBER | GROUP NAME | DEGREE OF ASSOCIATION BASED ON FILTERING ATTRIBUTE 1 | | DEGREE OF ASSOCIATION BASED ON HISTORY INFORMATION | DEGREE OF ASSOCIATION BASED ON FILTERING ATTRIBUTE 2 | | DEGREE OF ASSOCIATION BASED ON FILTERING ATTRIBUTES AND HISTORY INFORMATION |
|---|---|---|---|---|---|---|---|
| | | NUMBER OF ADDRESSES | RANK | | NUMBER OF ADDRESSES | RANK | |
| 1 | E-MAIL GROUP (TOKYO) | 10 | 1 | 1 | 5 | 5 | 1 |
| 2 | E-MAIL GROUP (OSAKA) | 1 | 4 | 3 | 6 | 4 | 3 |
| 3 | E-MAIL GROUP (SENDAI) | 5 | 3 | 2 | 0 | 8 | 5 |
| 4 | E-MAIL GROUP (FUKUOKA) | 0 | 6 | 4 | 9 | 2 | 4 |
| 5 | E-MAIL GROUP (KANAGAWA) | 1 | 4 | 5 | 10 | 1 | 2 |
| 6 | E-MAIL GROUP (NAGOYA) | 7 | 2 | 6 | 2 | 7 | 6 |
| 7 | E-MAIL GROUP (KYOTO) | 0 | 6 | 7 | 8 | 3 | 7 |
| 8 | E-MAIL GROUP (SAITAMA) | 0 | 6 | 8 | 4 | 6 | 8 |

INFORMATION PROCESSING APPARATUS AND NON-TRANSITORY COMPUTER READABLE MEDIUM FOR RECOMMENDING A GROUP AS A REGISTRATION DESTINATION FOR INFORMATION BASED ON AN ATTRIBUTE OF THE INFORMATION

CROSS-REFERENCE TO RELATED APPLICATIONS

This application is based on and claims priority under 35 USC 119 from Japanese Patent Application No. 2019-072279 filed Apr. 4, 2019.

BACKGROUND

(i) Technical Field

The present disclosure relates to an information processing apparatus and a non-transitory computer readable medium.

(ii) Related Art

Information processing apparatuses that divide registered addresses into groups and manage the addresses in groups exist. For example, in such information processing apparatuses, for registration of a new address by a user, in order to reduce time and effort to specify a group into which the address is to be registered, the group into which the address is to be registered may be presented.

In Japanese Unexamined Patent Application Publication No. 2017-112510, an information processing apparatus that performs control such that data is transmitted to a specified address is disclosed. The information processing apparatus includes acquiring means for acquiring a first address book in which addresses are registered in groups and a second address book in which addresses are registered not in groups, display control means for displaying a list of addresses registered in the first address book or the second address book acquired by the acquiring means on display means, first specifying means for additionally specifying an address desired by a user and selected from the displayed list of addresses as a transmission destination for the data, second specifying means for additionally specifying a new address input by the user as a transmission destination for the data, first determining means for determining, in a case where an instruction to register the new address specified by the second specifying means into an address book is issued, whether or not there is an address that has been additionally specified as the transmission destination by the first specifying means, second determining means for determining, in a case where the first determining means determines that there is no address that has been additionally specified as the transmission destination by the first specifying means, whether the address book displayed in the list of addresses by the display control means is the first address book in which addresses are registered in groups or the second address book in which addresses are registered not in groups, and registering means for displaying, in a case where the second determining means determines that the displayed address book is the first address book, a list of groups included in the first address book, allowing the user to select a desired group, and registering the new address into the selected group in the first address book.

SUMMARY

Aspects of non-limiting embodiments of the present disclosure relate to providing an information processing apparatus that is able to present, in registration of a registered address into a preset group, a group having an attribute of an address to be registered, and a non-transitory computer readable medium.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a reception unit and a controller. The reception unit receives registration of an address. The controller performs, when the reception unit receives registration of the address, control such that a group having an attribute of the address, among preset groups, is presented as a recommended registration destination for the address.

BRIEF DESCRIPTION OF THE DRAWINGS

Exemplary embodiments of the present disclosure will be described in detail based on the following figures, wherein:

FIG. 12 is an explanatory diagram for explaining an example of execution of a process for setting the degree of association;

FIG. 14 is an explanatory diagram for explaining another example of execution of the process for setting the degree of association;

DETAILED DESCRIPTION

Hereinafter, exemplary embodiments will be described with reference to drawings. Components and processes with the same function will be referred to with the same signs throughout the drawings, and redundant explanation will be omitted.

First Exemplary Embodiment

Figure 1:
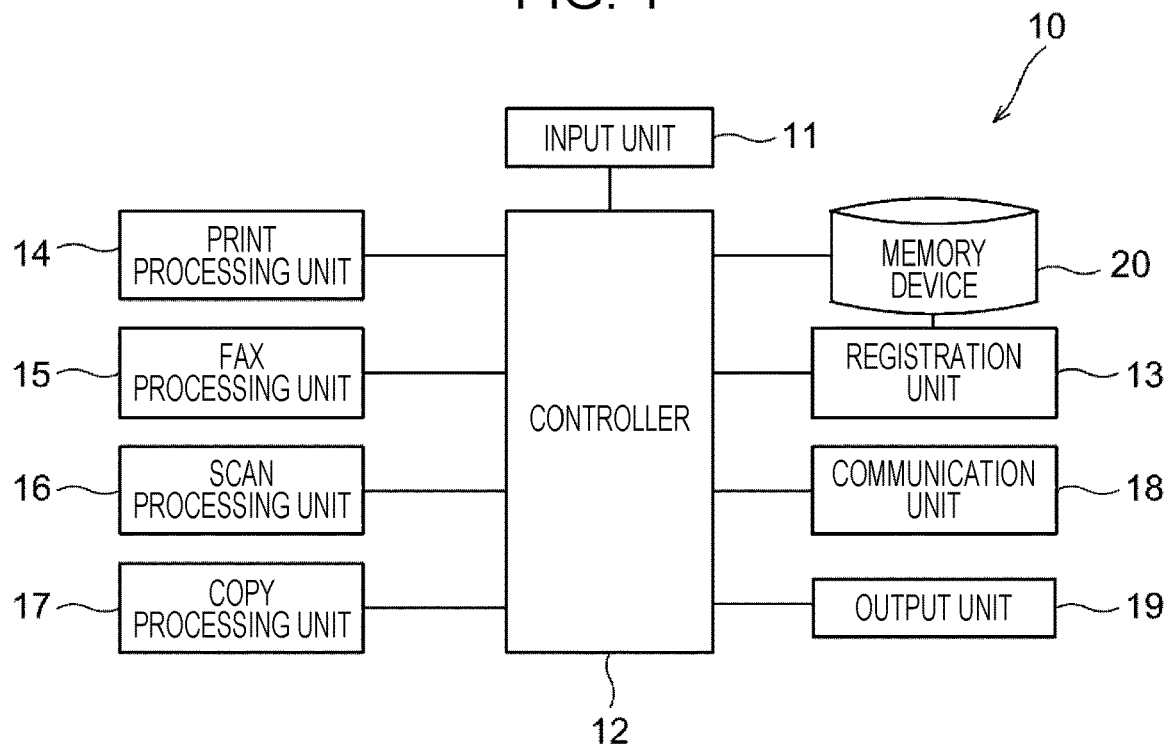
FIG. 1 is a diagram illustrating an example of the functional configuration of an image forming apparatus.

FIG. 1 is a diagram illustrating an example of the functional configuration of an image forming apparatus 10 according to a first exemplary embodiment. The image forming apparatus 10 is, for example, an electronic apparatus having multiple functions regarding formation of images, such as a print function, a facsimile function, a scan function, and a copy function, and provides a function required by a user.

The image forming apparatus 10 may have functions different from those mentioned above as long as the functions relate to formation of images. The image forming apparatus 10 may have, for example, a function for performing image processing for an input image and thus processing the image. Furthermore, the image forming apparatus 10 does not necessarily include multiple functions regarding formation of images. The image forming apparatus 10 may have a single function.

As illustrated in FIG. 1, the image forming apparatus 10 includes functional units including an input unit 11, a controller 12, a registration unit 13, a print processing unit 14, a facsimile (FAX) processing unit 15, a scan processing unit 16, a copy processing unit 17, a communication unit 18, and an output unit 19 and a memory device 20.

The input unit 11 receives an instruction from a user and notifies the controller 12 of the received instruction. Instructions from a user may include, for example, an instruction to start a function desired by the user, an instruction to set a setting item for defining an operation of the image forming apparatus 10, and the like. An instruction to register an address is one among those instructions.

An "address" represents information indicating another person to or from whom information is transmitted or received. Information used as an address may be any type of information that helps identify another person. For example, a postal address, a telephone number, a FAX number, an e-mail address, or an account of a social networking service (SNS) is an example of an address. The e-mail address or the like mentioned above is information indicating a transmission destination for information. For example, a name, which may not be regarded as a transmission destination for information but serve as information helping identify another person, is also regarded as an address used in an exemplary embodiment.

In the image forming apparatus 10, for example, an address is registered to be used for transmission of image data generated by the scan processing unit 16, which will be described later, to a specified person.

Figure 2:
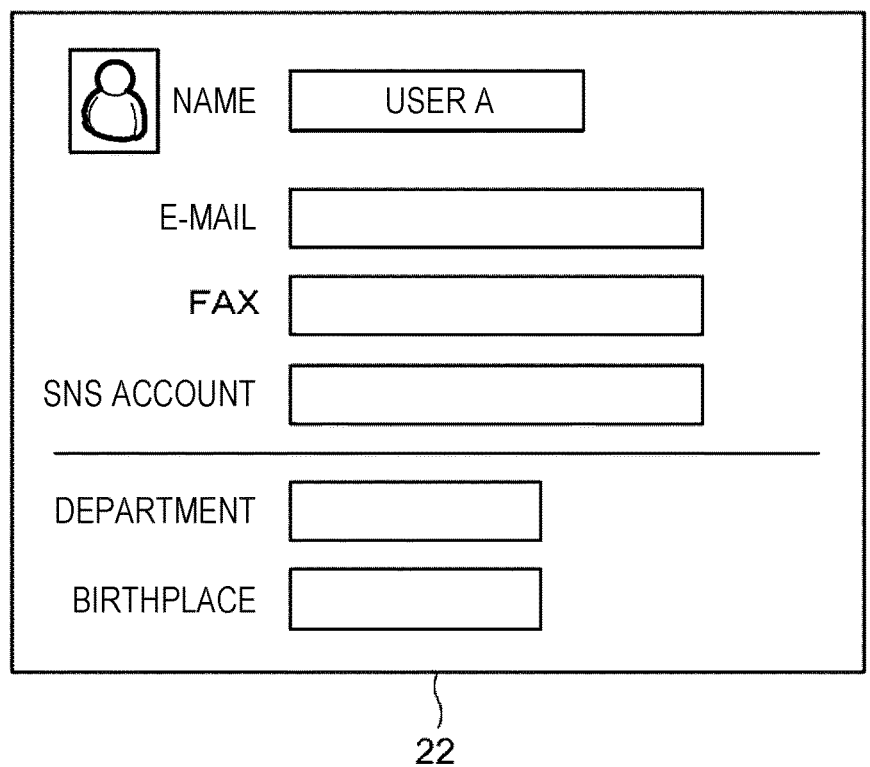
FIG. 2 is a diagram illustrating an example of a registration screen.

FIG. 2 is a diagram illustrating an example of a registration screen 22 used for registering an address into the image forming apparatus 10. In the example of the registration screen 22 illustrated in FIG. 2, a name, an e-mail address, a FAX number, and an SNS account of another person are registered.

In the registration screen 22, an input field for inputting information indicating the details of another person represented by an address is provided, and the information is registered, along with the address, into the image forming apparatus 10. In the example of the registration screen 22 illustrated in FIG. 2, an input field for inputting a department in a company the person works for and a birthplace is provided. Obviously, however, any type of information that indicates the details of the person, such as the age, a school the person graduated from, and hobbies, may also be input. Such information indicating the details of the person (hereinafter, may be referred to as "each piece of information indicating the details of another person) is also information to be used for identifying the person, and may therefore be used as an address.

Hereinafter, for example, each piece of information indicating the details of another person included in the registration screen 22 in FIG. 2 will be referred to as an "attribute of an address".

The controller 12 controls other functional units and the memory device 20 included in the image forming apparatus 10 such that processing according to an instruction from a user received by the input unit 11 is performed.

When the input unit 11 receives an instruction for registering an address, the registration unit 13 registers the address input to the registration screen 22 into the memory device 20, under the control of the controller 12.

For example, a user may select an address as a transmission destination from among addresses registered in the memory device 20 and transmit image data to the selected address. In this case, if the registered addresses are simply displayed as a list, the time required to find a desired address tends to become longer as the number of addresses registered in the memory device 20 increases. Thus, the image forming apparatus 10 is configured to be able to manage addresses in groups.

A "group" represents a management unit in the case where addresses are categorized and managed. A group may be created according to an instruction from a user or may already exist in an apparatus. For creation of a group, an attribute of the group is set by a user for the purpose of notifying presence of the group. As an attribute of a group, for example, an attribute indicating a feature of the whole group, such as the date and time when the group was created or the name who created the group, as well as the name of the group, may be set.

Furthermore, a group that already exists in the apparatus may be, for example, a group set in default settings of the apparatus or a group set as standard equipment in the default stage at the time of purchase of the apparatus. A group that already exists may be, for example, a group categorized according to a function provided by the apparatus, such as a group for FAX, a group for e-mail, or the like.

In the case where addresses are managed in units of groups, for example, a tendency of addresses included in a group may be drawn from an attribute representing a feature of the whole group, such as a group name. Therefore, by selecting a group, filtering to desired addresses may be achieved. Thus, in the case where addresses are managed in groups, the time required to select a desired address is shortened and operability is improved, compared to the case where a list of addresses registered in the memory device 20 is displayed and a user selects a desired address from the displayed list of addresses.

In contrast, in the case where a desired address is not registered in a group for which "it may be estimated that the desired address is registered in the group", that is, a "group suitable for the address", even if addresses are managed in groups, it is difficult for the user to find the desired address from the groups.

Thus, at the time when the registration unit 13 registers an address into the memory device 20, the controller 12 performs control such that a group suitable for the address, from among a plurality of groups, is displayed as a recommended registration destination for the address. A method for selecting a group suitable for an address from among a plurality of groups will be described in detail later.

The print processing unit 14 is a functional unit that executes a print function, for example, for forming, when receiving image data along with a print instruction, contents of the image data on a recording medium such as paper, under the control of the controller 12.

The FAX processing unit 15 is a functional unit that executes a facsimile function, for example, for transferring, when receiving image data along with a FAX instruction, the image data via a FAX line, which is not illustrated in FIG. 1, under the control of the controller 12.

The scan processing unit 16 is a functional unit that executes a scan function, for example, for optically reading, when receiving an instruction for reading an image, contents written in a document and generating image data of the document, under the control of the controller 12.

The copy processing unit 17 is a functional unit that executes a copy function, for example, for forming, when receiving an instruction for copying a document, an image of image data of the document read by the scan processing unit 16 on a recording medium and generating a copy of the read document, in collaboration with the print processing unit 14 and the scan processing unit 16, under the control of the controller 12.

The communication unit 18 transfers, for example, various types of information to and from an apparatus connected to a communication line, such as a FAX line, a telephone line, and the Internet, which are not illustrated in FIG. 1, under the control of the controller 12. For example, the communication unit 18 transmits image data generated by the scan processing unit 16 to a specified e-mail address or SNS account, via the communication line. Furthermore, the communication unit 18 transmits image data received from the FAX processing unit 15 to a specified FAX number via the FAX line, under the control of the controller 12. When receiving image data via the FAX line, the communication unit 18 notifies the controller 12 so that the image data will be processed by the FAX processing unit 15. In addition, when receiving image data via the communication line, the communication unit 18 notifies the controller 12 so that contents of the image data will be formed on a recording medium by the print processing unit 14.

A transmission destination for image data is specified, for example, by user's selecting the transmission destination from among addresses registered in the memory device 20 by the registration unit 13.

The output unit 19 outputs a processing state in the image forming apparatus 10 and various screens for receiving various instructions from a user to a display unit 38B, under the control of the controller 12.

The image forming apparatus 10 illustrated in FIG. 1 is implemented by, for example, a computer 30.

Figure 3:
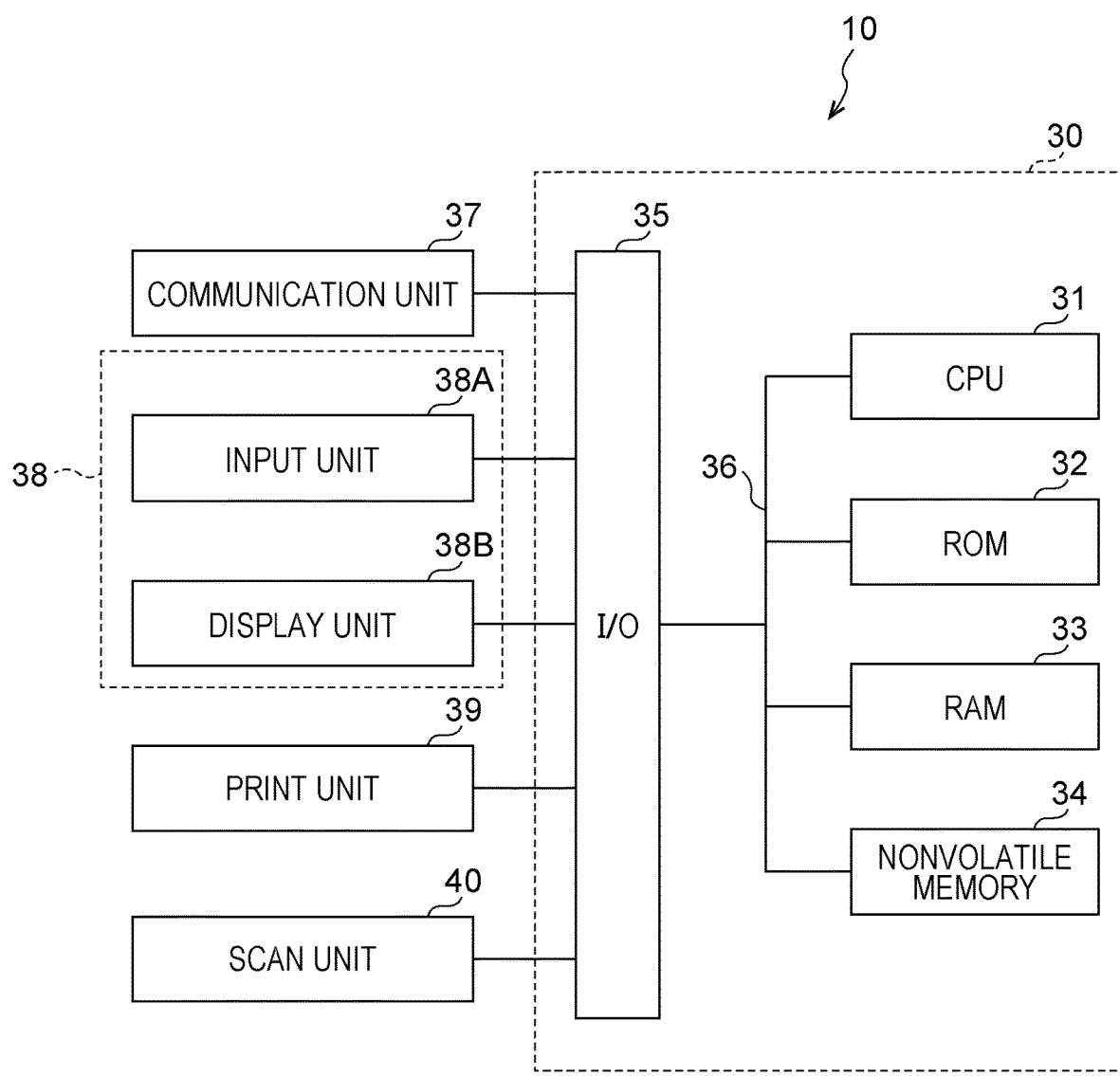
FIG. 3 is diagram illustrating an example of the configuration of a principal part of an electrical system of an image forming apparatus.

FIG. 3 is a diagram illustrating an example of the configuration of a principal part of an electrical system of the image forming apparatus 10 including the computer 30.

The computer 30 includes a central processing unit (CPU) 31 that manages functional units of the image forming apparatus 10, a read only memory (ROM) 32 that stores an information processing program for causing the computer 30 to function as functional units of the image forming apparatus 10, a random access memory (RAM) 33 that is used as a temporary operation region of the CPU 31, a nonvolatile memory 34, and an input/output interface (I/O) 35. The CPU 31, the ROM 32, the RAM 33, the nonvolatile memory 34, and the I/O 35 are connected to one another via a bus 36.

The nonvolatile memory 34 is an example of a memory device in which stored information is maintained even if power supplied to the nonvolatile memory 34 is interrupted. For example, a semiconductor memory is used as the nonvolatile memory 34. However, a hard disk may be used as the nonvolatile memory 34. The nonvolatile memory 34 is not necessarily built in the computer 30. The nonvolatile memory 34 may be a memory device that is detachable from the computer 30, such as a memory card.

For example, a communication unit 37, an operation unit 38, a print unit 39, and a scan unit 40 are connected to the I/O 35.

The communication unit 37 is connected to a communication line and includes a communication protocol for data communication with apparatuses connected to the communication line. The communication protocol provided in the communication unit 37 may include, for example, a communication protocol conforming to G3 standards defining FAX communication. Therefore, the communication unit 37 also supports FAX communication.

The operation unit 38 is a unit that provides to a user an interface with the image forming apparatus 10, and is mounted, for example, at the housing of the image forming apparatus 10. The operation unit 38 includes an input unit 38A and the display unit 38B.

The input unit 38A is an input device that receives an instruction from a user and notifies the CPU 31 of the received instruction. For example, a button, a touch panel, and the like may be used as the input unit 38A. The image forming apparatus 10 receives an instruction from a user via the input unit 38A. An instruction from a user may be sound. In this case, a microphone is used as the input unit 38A.

The display unit 38B is a device that displays information processed by the CPU 31. For example, a liquid crystal display, an organic electroluminescence (EL) display, or the like may be used as the display unit 38B.

The print unit 39 is a unit that forms an image on a recording medium in accordance with an instruction by the CPU 31. Any image forming method may be used in the print unit 39. For example, an electrophotographic system or an inkjet system may be used. The print unit 39 is used when the print function, the copy function, or the FAX function is executed.

The scan unit 40 is a unit that optically reads, for example, contents of a document placed on platen glass, which is not illustrated in FIG. 3, and converts the contents of the document into image data, in accordance with an instruction by the CPU 31. The scan unit 40 is used when the scan function is executed.

The copy function is implemented when the CPU 31 causes the print unit 39 to form image data obtained by the scan unit 40 on a recording medium.

Next, an operation of the image forming apparatus 10 that presents a group suitable for an input address will be explained.

Figure 4:
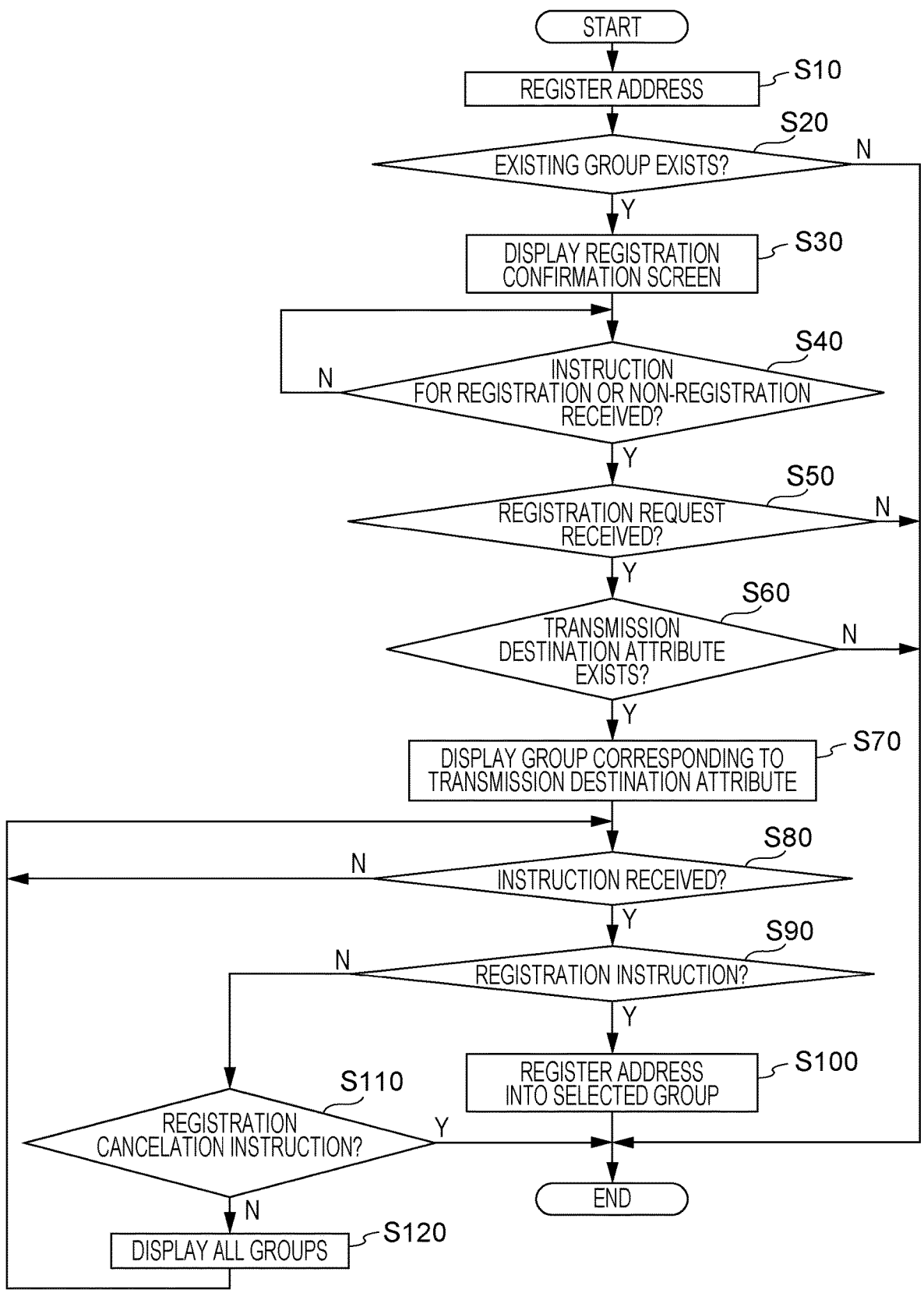
FIG. 4 is a flowchart illustrating an example of the flow of a process for registering an address in an image forming apparatus.

FIG. 4 is a flowchart illustrating an example of the flow of a process for registering an address performed by the CPU 31, when a user inputs an address on the registration screen 22 illustrated in FIG. 2 and the image forming apparatus 10 receives the address input on the registration screen 22. An information processing program that defines the process for registering an address is stored in advance, for example, in the ROM 32 of the image forming apparatus 10. The CPU 31 of the image forming apparatus 10 reads he information processing program stored in the ROM 32 and performs the process for registering an address.

For convenience of explanation, it is assumed that, for example, the image forming apparatus 10 transmits image data to a destination, using at least one of e-mail, FAX, and SNS. That is, in the image forming apparatus 10, a plurality of groups are created for each of e-mail, FAX, and SNS so that a user is able to easily select a transmission destination for image data. As described above, a method for transmission of image data by the image forming apparatus 10 is not necessarily e-mail, FAX, or SNS. Any method may be used as long as image data is transmitted via a communication line.

First, in step S10, the CPU 31 stores a received address into, for example, the nonvolatile memory 34, so that the newly received address (a registration target address) is registered into the image forming apparatus 10. In a state in which an address is simply registered in the image forming apparatus 10, the address is not registered in any group. Thus, the registered address is not displayed on the operation unit 38 by selection of a group. The registered address is displayed only in the case where a list of registered addresses is displayed.

To filter addresses by selection of a group, addresses need to be registered into groups. To register addresses into groups, a group into which an address is to be registered needs to be created.

Thus, in step S20, the CPU 31 determines whether or not there is at least one group that has already been created (hereinafter, referred to as "existing group"). In the case where there is no existing group, the newly registered address is not registered in any group, and the process for registering an address illustrated in FIG. 4 ends. An existing group is an example of a preset group in an exemplary embodiment.

The CPU 31 may display a message, such as "Do you wish to create a new group into which an address is to be registered?", on the display unit 38B. When the user issues an instruction to create a group, the CPU 31 may create a group having an attribute according to the instruction from the user. The CPU 31 registers an address into the created group.

In contrast, in the case where it is determined in step S20 that there is at least one existing group, the process proceeds to step S30.

In this case, there is at least one group into which an address is to be registered in the image forming apparatus 10. Therefore, in step S30, the CPU 31 displays on the display unit 38B a registration confirmation screen 24 for confirming with the user as to whether or not the address is to be registered into one of the at least one group.

Figure 5:
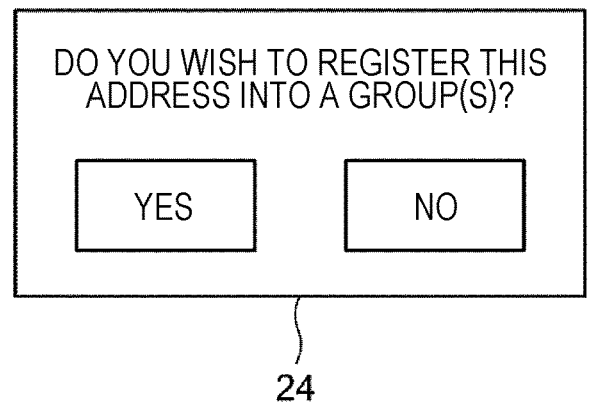
FIG. 5 is a diagram illustrating an example of a registration confirmation screen.

FIG. 5 is a diagram illustrating an example of the registration confirmation screen 24. In the case where a user wishes to register a new address input on the registration screen 22 into a group(s), the user presses a "YES" button. When the "YES" button is pressed, a registration request is notified to the CPU 31. In contrast, some users may not wish to register an address into a group. These users press a "NO" button. When the "NO" button is pressed, a registration refusal request is notified to the CPU 31.

Thus, in step S40, the CPU 31 determines whether or not an instruction to register or not to register the address into a group has been received. In the case where an instruction to register or not to register the address into a group has not been received, the CPU 31 performs the determination processing of step S40 in a repetitive manner until an instruction to register or not to register the address into a group has been received. In contrast, when an instruction to register or not to register the address into a group has been received, the process proceeds to step S50.

In step S50, the CPU 31 determines whether or not the received instruction is a registration request. In the case where the received instruction is not a registration request, that is, in the case where a registration refusal request is received, the CPU 31 does not register the newly registered address into any group, and the process for registering an address illustrated in FIG. 4 ends. In contrast, in the case where the received instruction is a registration request, the process proceeds to step S60.

In step S60, the CPU 31 determines whether or not an attribute of the address that represents a transmission destination for image data (may also be referred to as a "transmission destination attribute") is included in the address. In the case where the transmission destination attribute is not included in the address, for example, a message, such as "The address was not able to be registered into a group.", is displayed on the display unit 38B. The newly registered address is not registered into any group, and the process for registering an address illustrated in FIG. 4 ends.

In this case, a message that prompts the user to set a transmission destination attribute for the newly registered address may be displayed on the display unit 38B, so that the message is notified to the user. When the user sets a transmission destination attribute for the address, the CPU 31 starts the processing of step S70 in the process for registering an address illustrated in FIG. 4.

In contrast, in the case where the transmission destination attribute is included in the address, the process proceeds to step S70.

In step S70, the CPU 31 selects whether or not each existing group is suitable for the registration target address, based on the transmission destination attribute included in the address, and displays, as a recommended registration location for the address, a group selected as the group suitable for the address on the display unit 38B.

Figure 6:
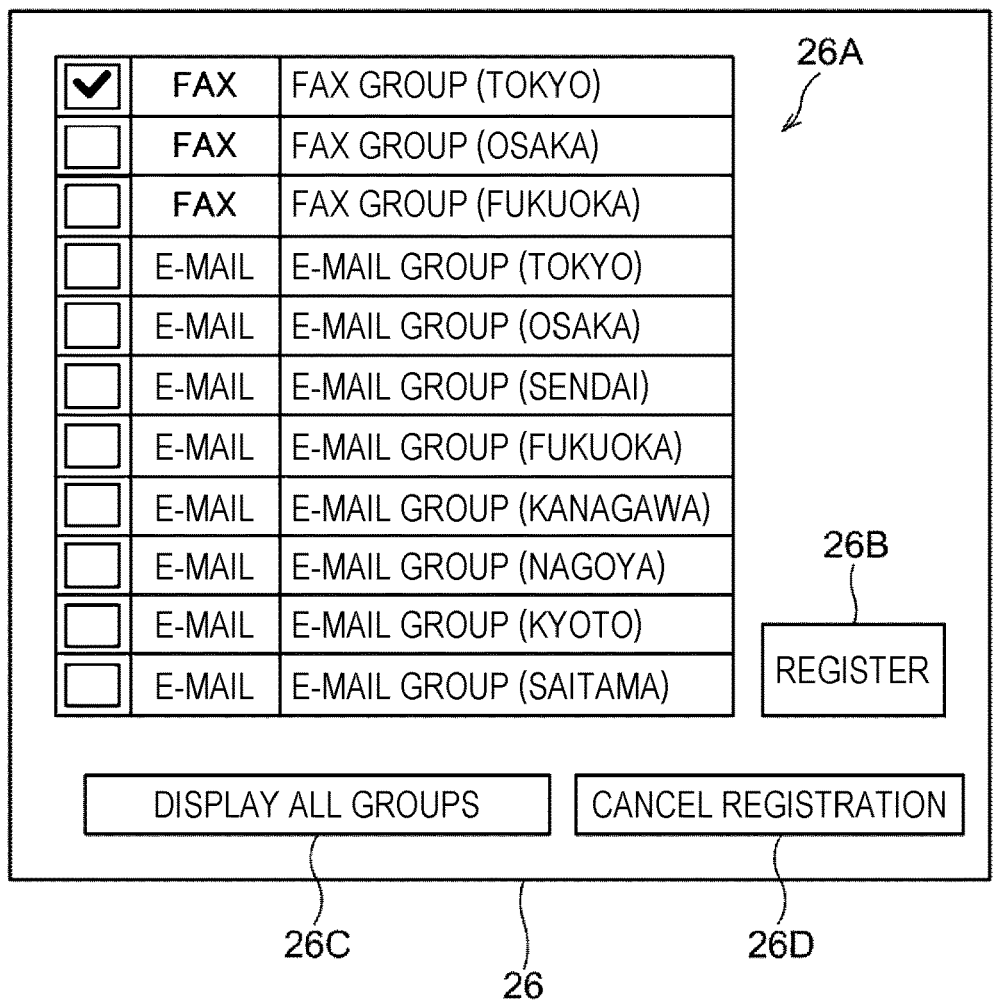
FIG. 6 is a diagram illustrating an example of a group selection screen.

FIG. 6 is a diagram illustrating an example of a group selection screen 26. The group selection screen 26 includes, for example, a group list 26A in which groups serving as recommended registration destinations are displayed, a register button 26B for confirming a group serving as a registration destination for an address, a display button 26C for displaying all groups, and a cancel button 26D for canceling registration of an address into a group.

The CPU 31 selects, based on a setting state of the transmission destination attribute, a group that is considered as being associated with the registration target address from among the existing groups, and displays the selected group in the group list 26A.

Specifically, in the case where an e-mail address is included in the registration target address, the CPU 31 selects groups associated with e-mail from the existing groups and displays the selected groups in the group list 26A. The determination as to whether or not a group is associated with e-mail is made, for example, by determining whether or not a group name includes a character string "e-mail" or by referring to an attribute indicating contents of categorization or the like that is set for creation of the group. As described above, the determination may be made based on formal information such as a parameter that may be changed or edited for a group by a user in a desired manner or an element actually forming a group (for example, information indicating whether or not an e-mail address is written in an address belonging to the group or information, such as a parameter, that is included in an address belonging to the group and is not able to be changed or edited by a different user in a desired manner).

In the case where the registration target address includes a FAX number, the CPU 31 selects groups associated with FAX from among existing groups and displays the selected groups in the group list 26A. Furthermore, in the case where the registration target address includes an SNS account, the CPU 31 selects groups associated with an SNS from among existing groups and displays the selected groups in the group list 26A.

Furthermore, in the case where the registration target address includes an e-mail address and a FAX number, the CPU 31 selects groups associated with e-mail and FAX from among existing groups and displays the selected groups in the group list 26A. As described above, in the case where at least two transmission destination attributes out of an e-mail address, a FAX number, and an SNS account is included in the address, the CPU 31 selects groups associated with each of the transmission destination attributes included in the registration target address and displays the selected groups in the group list 26A.

In the example of the group selection screen 26 illustrated in FIG. 6, groups associated with e-mail and FAX are displayed in the group list 26A.

In the case where a plurality of groups associated with the registration target addresses exist, the CPU 31 displays each of the groups associated with the address in the group list 26A. If there are too many groups associated with the address to be displayed at the same time on the group selection screen 26, the CPU 31 arranges a scroll button or a page change button on the group selection screen 26 so that each of the groups associated with the address may be presented to the user.

In the group list 26A, checkboxes are associated with individual groups. When the user presses a checkbox for a desired group into which an address is to be registered so that a checkmark is added to the corresponding checkbox and then presses the register button 26B, the address is registered into the group for which the checkmark is provided. That is, when the register button 26B is pressed, an instruction to register the address is notified to the CPU 31.

In the example of the group selection screen 26 in FIG. 6, group names are displayed in the group list 26A. However, for example, when a group name is pressed, the CPU 31 may display information that would be helpful for the user to select a group into which the address is to be registered. For example, the CPU 31 may display addresses that have already been registered in a group whose group name is pressed.

In the case where the user adds checkmarks to a plurality of groups and then presses the register button 26B, the CPU 31 registers the address into each of the groups to which the checkmarks are added.

In the case where no group suitable for a registration destination for the address is displayed in the group list 26A and the user wishes to view groups other than the groups displayed in the group list 26A, the user presses the display button 26C, which indicates "Display all groups". When the display button 26C is pressed, an instruction for updating an address is notified to the CPU 31.

For example, in the case where a user who does not know an SNS account of another person inputs an address on the registration screen 22 with an SNS account field left blank, intending to set the SNS account later as the address, and only groups associated with e-mail and FAX are thus displayed in the group list 26A, as in the group selection screen 26 illustrated in FIG. 6, the user presses the display button 26C so that groups associated with SNS may be displayed in the group list 26A.

Furthermore, a user who wishes to cancel registration of an address into a group for some reason presses the cancel button 26D, which indicates "Cancel registration". When the cancel button 26D is pressed, an instruction to cancel registration is notified to the CPU 31.

In step S80, the CPU 31 determines, via the group selection screen 26, whether or not an instruction has been received from the user. In the case where no instruction has been received, the CPU 31 performs the determination processing of step S80 in a repetitive manner until an instruction has been received from the user. In contrast, in the case where an instruction has been received from the user, the process proceeds to step S90.

In step S90, the CPU 31 determines whether or not the received instruction is a registration instruction. In the case where a registration instruction is received, the process proceeds to step S100.

In step S100, the CPU 31 registers the address into each of the groups to which the checkmarks are added, by referring to the group list 26A on the group selection screen 26. Then, the process for registering an address illustrated in FIG. 4 ends.

Figure 7:
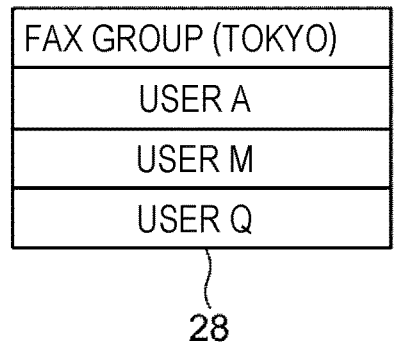
FIG. 7 is a diagram illustrating an example of a state in which addresses are registered in a group.

For example, as illustrated in FIG. 6, in the case where "FAX group (Tokyo)" is selected as a registration destination for the address of a user A, the user A is registered in the "FAX group (Tokyo)" (see FIG. 7). When a user who wishes to transmit image data to the user A by FAX selects the user A from the FAX group (Tokyo), the image data is transmitted to a FAX number associated with the user A.

In contrast, in the case where it is determined in the determination processing of step S90 that the received instruction is not a registration instruction, the process proceeds to step S110.

In step S110, the CPU 31 determines whether or not the received instruction is a registration cancelation instruction. In the case where a registration cancelation instruction is received, the user does not wish to register the address into a group. Therefore, the newly registered address is not registered into any group, and the process for registering an address illustrated in FIG. 4 ends.

In contrast, in the case where the instruction received in the determination processing of step S110 is not a registration cancelation instruction, the process proceeds to step S120.

In this case, the CPU 31 receives an instruction for updating an address. Therefore, the process proceeds to step S120. In step S120, the CPU 31 displays, for example, groups before filtering based on the transmission destination attribute, that is, all the existing groups present in the image forming apparatus 10, in the group list 26A of the group selection screen 26. Then, to receive a new instruction from the user via the group selection screen 26 on which the group list 26A has been updated, the process proceeds to step S80 to wait for a new instruction from the user. Then, the CPU 31 performs the processing of step S80 and later processing described above, in accordance with an instruction from the user.

In the processing of step S120 in the process for registering an address illustrated in FIG. 4, when the CPU 31 receives an instruction for updating an address, all the existing groups present in the image forming apparatus 10 are displayed in the group list 26A on the group selection screen 26. However, only groups that were not displayed in the group list 26A before reception of the instruction for updating the address may be selected and displayed in the group list 26A.

With the image forming apparatus 10 according to this exemplary embodiment, when a user wishes to register a new address, a group having an attribute associated with an attribute of the received address is presented to the user as a recommended registration destination for the address.

An operation for presenting to a user a group serving as a recommended registration destination for an address, along with registration of the address, has been explained above using the image forming apparatus 10. However, a display form of a group in this exemplary embodiment is not applied only to the image forming apparatus 10. The display form of a group according to this exemplary embodiment may also be applied to an information processing apparatus that receives registration of an address from a user, categorizes the registered address into a group, and manages the address. That is, the image forming apparatus 10 is an example of an information processing apparatus according to an exemplary embodiment.

An information processing apparatus according to an exemplary embodiment may also be, for example, an information apparatus that has a function for registering and displaying an address, such as a desktop computer, a tablet computer, a smartphone, or a wearable terminal.

First Modification of First Exemplary Embodiment

In the first exemplary embodiment, an example in which a group associated with an address is presented, by paying attention to a transmission destination attribute of the address, has been explained. For example, in the case where an e-mail address is included in an address and there are finely divided groups associated with e-mail, all the groups associated with e-mail are displayed in the group list 26A on the group selection screen 26. In the case where there are, for example, one hundred groups associated with e-mail, the one hundred groups are displayed in the group list 26A.

In such a case, even if the groups displayed in the group list 26A are suitable for an address, a user needs to select a group suitable for the address from among a huge number of groups. The time required to select a group becomes longer as the number of groups increases.

Thus, in this modification, an operation of the image forming apparatus 10 for filtering groups displayed in the group list 26A, based on an attribute different from an attribute used for selecting a group displayed in the group list 26A in step S70 of FIG. 8 and history information regarding the group, will be explained.

"History information regarding a group" represents information recorded, along with an operation for selecting a group or an operation for registering an address into the group by a user, unlike an attribute of the group set by a user who created the group. In the case where selection of a group or registration of an address into the group is performed, for example, the image forming apparatus 10 stores, as history information, information, such as the number of times that the group has been selected, the time zone in which the group is selected, a user identification (ID) for uniquely identifying a user who selected the group, the number of registered addresses for each group, the time zone in which the address is registered, and a user ID of a user who registered the address into the group, and information such as the number of times that a message has been transmitted and the time zone in which the final message was transmitted for a group in which message transmission is able to be performed, into the nonvolatile memory 34. In this modification, such history information is used for setting the degree of association between the address and the group.

Figure 8:
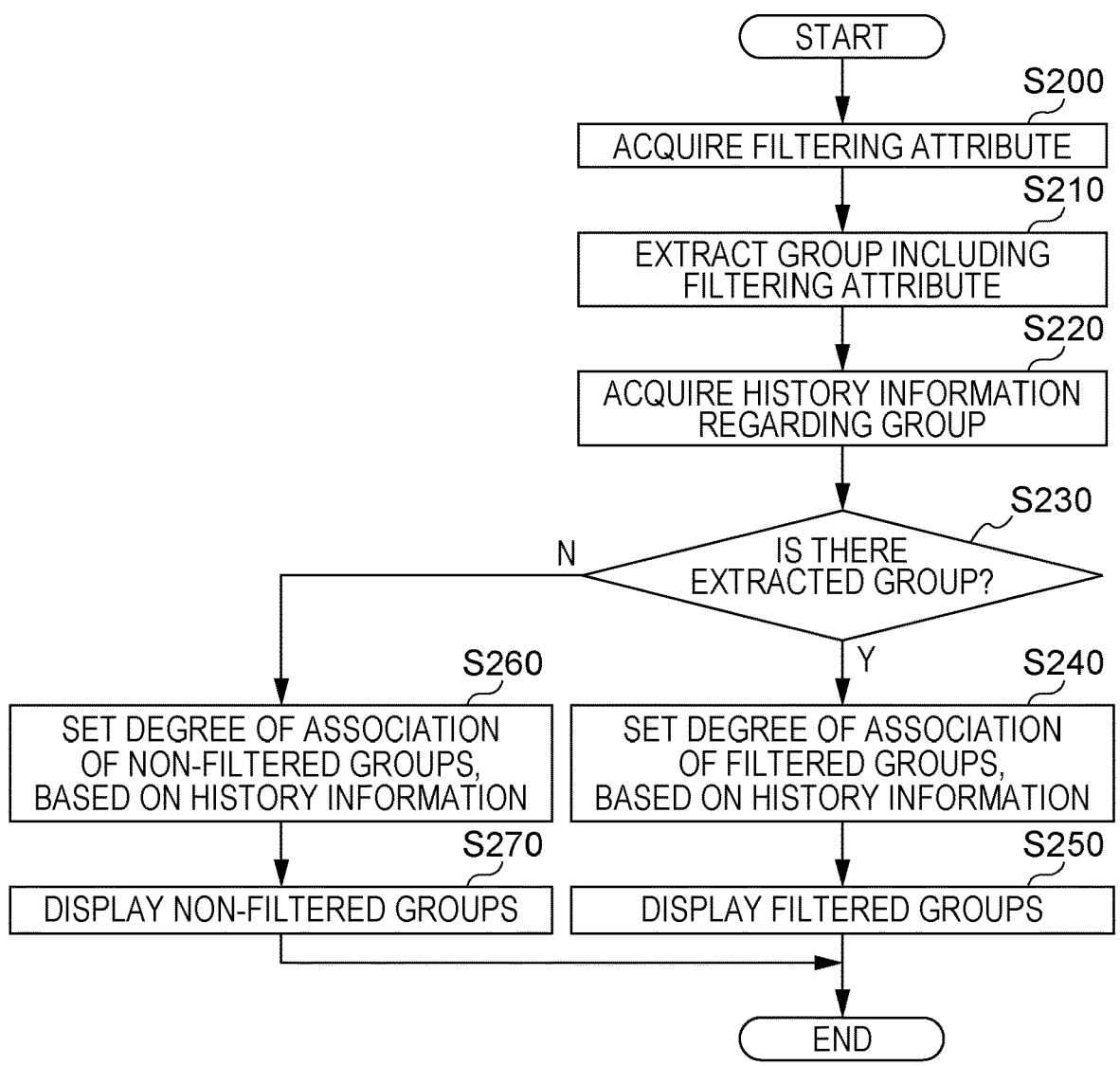
FIG. 8 is a flowchart illustrating an example of the flow of a process for filtering groups in an image forming apparatus.

FIG. 8 is a flowchart illustrating an example of the flow of a process for filtering groups performed by the CPU 31 after a group suitable for an address is selected based on a transmission destination attribute from among a plurality of existing groups in step S70 in the process for registering an address illustrated in FIG. 4 and before the process for registering an address proceeds to step S80. An information processing program that defines the process for filtering groups is stored in advance, for example, in the ROM 32 of the image forming apparatus 10. The CPU 31 of the image forming apparatus 10 reads the information processing program stored in the ROM 32 and performs the process for filtering groups.

In step S200, an attribute different from the attribute used for selection of the group in step S70 in FIG. 4 is acquired from the registration target address.

In this exemplary embodiment, the group suitable for the address is selected based on the transmission destination attribute in step S70 in FIG. 4. Therefore, the CPU 31 acquires an attribute different from the transmission destination attribute. Hereinafter, an attribute used for further filtering groups suitable for an address from among groups selected as those suitable for the address in accordance with the attribute of the address and the attribute of the group will be referred to as an "filtering attribute". Furthermore, for convenience of explanation, a group selected according to the attribute of the address and the attribute of the group in step S70 in FIG. 4 will be referred to as a "first group".

An attribute used as a filtering attribute may be specified by a user when, for example, an address is registered on the registration screen 22 illustrated in FIG. 2. In the case where the user does not specify a filtering attribute, a predetermined attribute is acquired as a filtering attribute. Here, an example in which the CPU 31 acquires a department set on the registration screen 22 as a filtering attribute will be explained. In this example, as the department on the registration screen 22, a "sales department" is set.

In step S210, the CPU 31 extracts, from among first groups, a group including an address for which the filtering attribute acquired in step S200 is set. Accordingly, a group in which an address having the same attribute as that of the registration target address is registered is extracted. Specifically, a group including an address for which the "sales department" is set as the department is extracted. Therefore, a group that is selected based on the transmission destination attribute but includes only an address for which a "general affairs department" is set as the department is excluded, and filtering to groups suitable for the address is thus achieved.

Next, in step S220, the CPU 31 acquires history information regarding each of the first groups from the nonvolatile memory 34. As described above, history information regarding a group contains various types of information. Therefore, the user may specify a type of history information to be acquired in step S220. In the case where the user does not specify a type of history information to be acquired, a preset type of history information is acquired. Here, an example in which the number of times that each group has been selected in the case where a user sets a transmission destination for image data is acquired as history information will be explained.

In step S230, the CPU 31 determines whether or not there is a group extracted in step S210, that is, whether or not there is a group including an address for which the filtering attribute acquired in step S200 is set. In the case where there is a group extracted in step S210, the process proceeds to step S240.

In step S240, the CPU 31 sets, by combining the groups obtained by filtering based on the filtering attribute and the history information acquired in step S220, the degree of association between the address that the user wishes to register into a group, that is, the registration target address, and the filtered groups.

The degree of association of a group with an address represents the degree of recommendation as a registration destination for the address, which is calculated based on at least one of the attribute of the address and the history information of the group. A group with a higher degree of association with an address is a group with a higher degree of recommendation as a registration destination for the address.

For example, groups that include addresses for which "sales department" is set as the department are not usually selected at the same frequency as transmission destinations for image data, and in actuality, there is a difference between the numbers of times that the groups are selected. For example, a group that is selected less often than other groups may be a group in which an address of a person with whom transactions have ended is registered. Therefore, it is not desirable to register into such a group an address that is to be registered by a user who intends to use the address in future as a transmission destination for image data. Thus, in the case where acquired history information is the number of times that a group has been selected, the CPU 31 sets a higher degree of association with an address for a group that has been selected more often.

For example, in the case where acquired history information is a user ID of a user who has registered an address into a group, it may be said that the degree of probability that the user will register an address into a group into which the user ID of the user who wishes to register a registration target address is recorded more times is higher. Thus, high degree of association with the registration target address may be set.

Furthermore, in the case where a user works during the daytime for another person who is abroad, the time zone in which the person is registered into a group is often the daytime zone for the person. Therefore, registration of addresses tends to be performed in a specific time zone according to the country or region where a person stays. In such a case, for example, a time zone in which an address is registered into a group may be acquired as history information, and the degree of association between a registration target address and a group in which more addresses are registered in the same time zone as that in which a user wishes to register a registration target address into a group may be set higher.

As described above, the CPU 31 compares a state of registration of an address into a group by a user with a state of registration of an existing address into a group or a state of selection of a group, which is obtained by acquired history information, and sets the degree of association with a registration target address for each group, based on statistical information indicating the tendency of use of a group obtained according to the type of history information, such as a group having the same tendency or a frequently used group.

Then, in step S250, the CPU 31 displays each of the groups filtered using the filtering attribute in step S210 in the group list 26A on the group selection screen 26 such that the degree of association with the registration target address is indicated.

Specifically, the CPU 31 may display a numerical value indicating the degree of association, as well as the group name of a filtered group. For example, groups are ranked first, second, and so on in descending order from the group that has been selected the most times, and the rank according to the number of times that a group has been selected may be displayed as the degree of association with an address. Furthermore, the value of the number of times that a group has been selected may be directly displayed as the degree of association with a registration target address.

Furthermore, the CPU 31 may not display a numerical value as the degree of association with a registration target address. The degree of association with a registration target address may be represented based on a position at which a group is displayed. For example, by arranging a group with a higher degree of association with a registration target address in an upper position in the group list 26A, the CPU 31 may display filtered groups in descending order of the degree of association with the registration target address in the group list 26A.

The display form of the degree of association with a registration target address is not limited to this. The CPU 31 may display a group with a higher degree of association with a registration target address in a lower position in the group list 26A. Furthermore, the CPU 31 may increase the size of letters indicating a group name or a display region in which a group name is displayed in accordance with an increase in the degree of association of a group with the registration target address.

As described above, the process for filtering groups illustrated in FIG. 8 ends, and the CPU 31 proceeds to step S80 in the process for registering an address illustrated in FIG. 4.

In contrast, in the case where it is determined in the determination processing of step S230 that no group is extracted in step S210, that is, in the case where no group including an address for which the same filtering attribute as that of the registration target address exists as the first group, the process proceeds to step S260.

In this case, filtering of groups displayed in the group list 26A is not able to be performed based on the filtering attribute. However, in this modification, the history information regarding the groups is acquired in step S220, and therefore, the degree of association between the registration target address and each of the groups displayed in the group list 26A that have not been filtered based on the filtering attribute, that is, each of first groups, is set in accordance with the history information regarding the groups.

In the case where the acquired history information is the number of times that a group has been selected, as explained in the processing of step S240, it is not desirable that a group that has been selected not often is recommended as a registration destination for the registration target address. Therefore, the CPU 31 sets the degree of association with the registration target address such that a higher degree of association is set for a group that has been selected more times.

Then, in step S270, the CPU 31 displays each of the first groups in the group list 26A on the group selection screen 26 such that the degree of association with the registration target address is indicated, and the process for filtering groups illustrated in FIG. 8 ends. After that, the CPU 31 proceeds to step S80 of the process for registering an address illustrated in FIG. 4.

Figure 9:
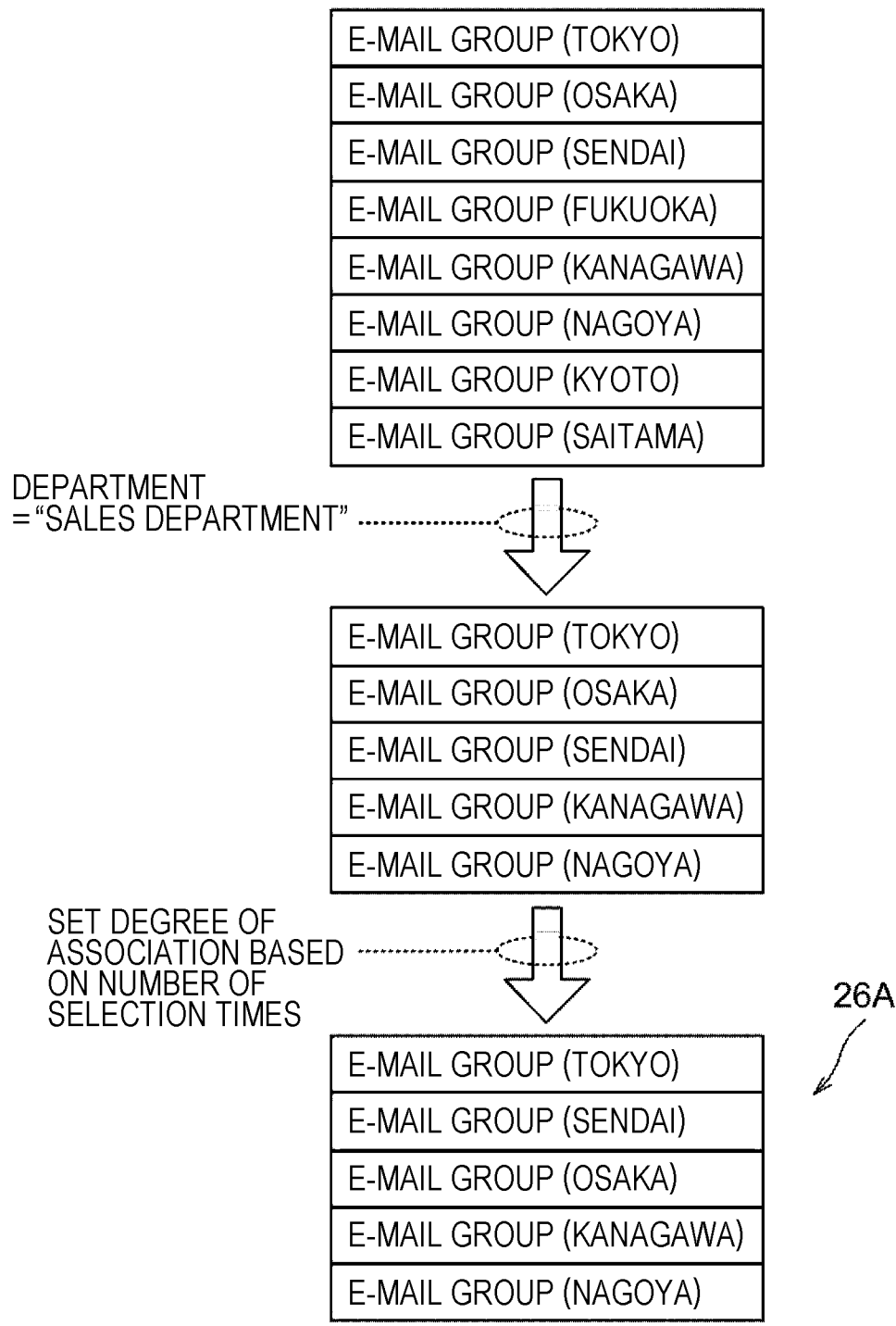
FIG. 9 is an explanatory diagram for explaining an example of execution of a process for filtering groups in an image forming apparatus.
Figure 10:
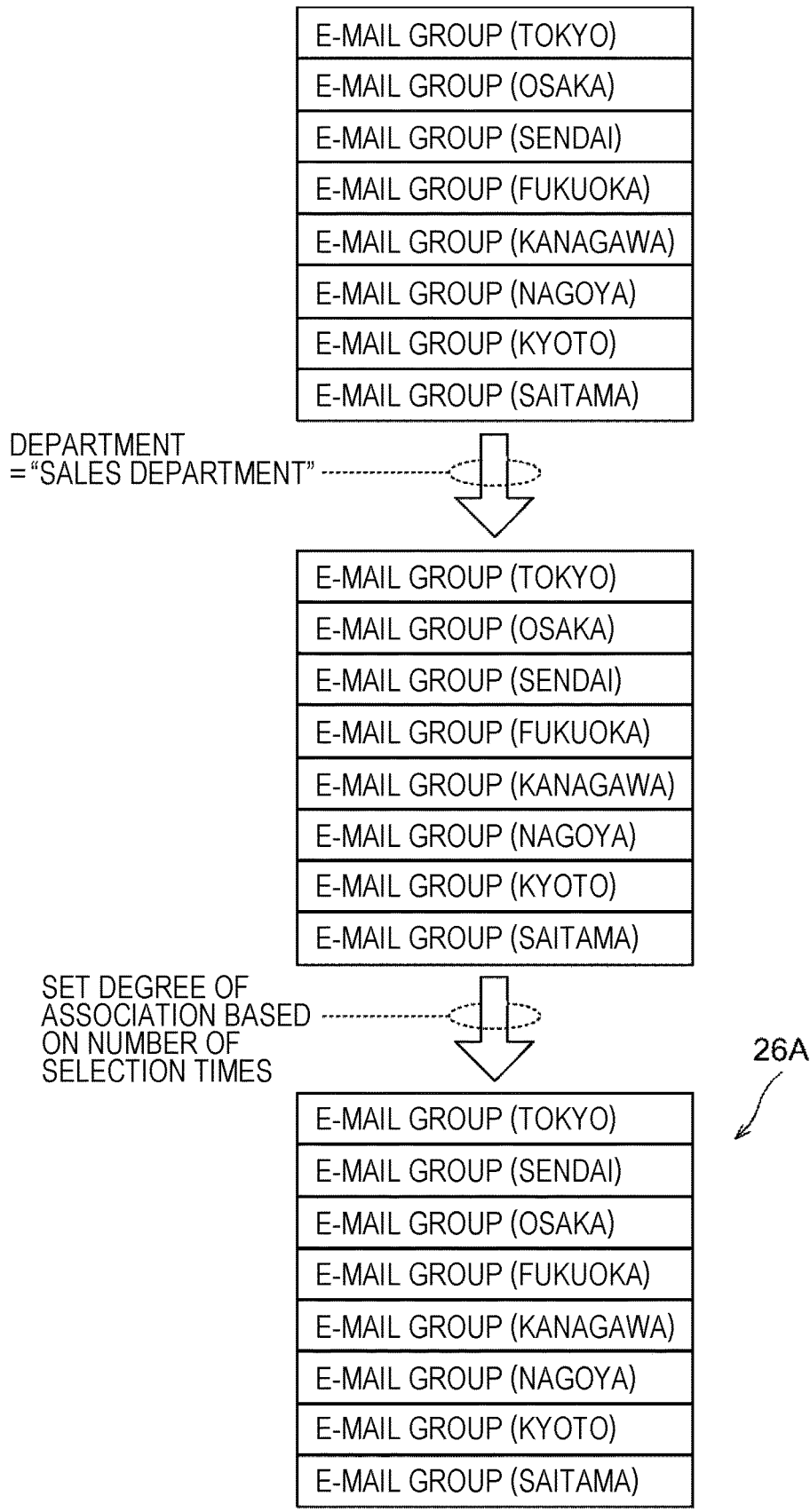
FIG. 10 is an explanatory diagram for explaining another example of execution of the process for filtering groups in the image forming apparatus.

FIGS. 9 and 10 are explanatory diagrams for a case where the process for filtering groups illustrated in FIG. 8 is performed according to "department=(sales department)" set for a registration target address as a filtering attribute and based on the number of times that a group has been selected as history information to be used for setting the degree of association with the address.

In FIGS. 9 and 10, "E-mail group (Tokyo)", "E-mail group (Osaka)", "E-mail group (Sendai)", "E-mail group (Fukuoka)", "E-mail group (Kanagawa)", "E-mail group (Nagoya)", "E-mail group (Kyoto)", and "E-mail group (Saitama)" are selected as the first groups. Furthermore, the size relation regarding the number of times that a group has been selected between the first groups is set to "E-mail group (Tokyo)">"E-mail group (Sendai)">"E-mail group (Osaka)">"E-mail group (Fukuoka)">"E-mail group (Kanagawa)">"E-mail group (Nagoya)">"E-mail group (Kyoto)">"E-mail group (Saitama)". In terms of the number of selection times, the groups are represented by "first place", "second place", and . . . "eighth place" in descending order from the group with the largest number of selection times.

In the example illustrated in FIG. 9, a state in which groups including addresses having an attribute of "department=(sales department)" are extracted from the first groups is illustrated, and a state in which an address having an attribute of "department=(sales department)" is included in each of "E-mail group=(Tokyo)", "E-mail group=(Osaka)", "E-mail group=(Sendai)", "E-mail group=(Kanagawa), and "E-mail group=(Nagoya)" is illustrated. The size relation regarding the number of selection times between the extracted groups is represented by "E-mail group=(Tokyo)">"E-mail group=(Sendai)">"E-mail group=(Osaka)">"E-mail group=(Kanagawa)">"E-mail group=(Nagoya)". Therefore, as illustrated in FIG. 9, for example, the groups are displayed in the order of "E-mail group=(Tokyo)", "E-mail group=(Sendai)", "E-mail group=(Osaka)", "E-mail group=(Kanagawa), and "E-mail group=(Nagoya)" from the top, in the group list 26A on the group selection screen 26.

In the example illustrated in FIG. 10, a state in which no group including an address having the attribute of "department=(sales department)" are included in the first groups is illustrated. In this case, each of the first groups is displayed in the group list 26A.

However, the size relation regarding the number of selection times between the first groups is represented by "E-mail group=(Tokyo)">"E-mail group=(Sendai)">"E-mail group=(Osaka)">"E-mail group=(Fukuoka)">"E-mail group=(Kanagawa)">"E-mail group=(Nagoya)">"E-mail group=(Kyoto)">"E-mail group=(Saitama)". Therefore, as illustrated in FIG. 10, the groups are displayed, for example, in descending order from the largest number of selection times from the top, in the group list 26A on the group selection screen 26.

In this modification, an example in which the groups displayed in the group list 26A on the group selection screen 26 are filtered from the first groups, based on the filtering attribute acquired from the registration target address, and then, the degree of association between the registration target address and the filtered groups is set according to history information for each of the groups, has been explained.

However, the degree of association between the registration target address and each group based on history information of the group is not necessarily set after the processing for filtering the groups displayed in the group list 26A based on the filtering attribute from the first groups is performed. After the degree of association between the registration target address and each first group based on history information of the group, the groups displayed in the group list 26A may be filtered from the first groups according to the filtering attribute. Furthermore, the first groups may be displayed in the group list 26A according to the degree of association between the address and each of the first groups set according to history information of the group, without filtering the groups displayed in the group list 26A based on the filtering attribute from the first groups.

In step S250 in FIG. 8, among the first groups, groups in which an address having the same filtering attribute as that of the registration target address is registered are displayed in the group list 26A. However, for example, the number of groups to be presented as recommended registration destinations for the address may be limited such that only the top N (N represents an integer of 1 or more) groups from the group with the highest degree of association with the registration target address may be displayed. The mode in which the number of groups to be presented as recommended registration destination for the address is limited may be applied to the case where each of the first groups is displayed in the group list 26A in step S270 of FIG. 8.

In this modification, by comparing an attribute of an address included in a group as an attribute of the group with an attribute of the registration target address, a group serving as a recommended registration destination for the address is extracted from the first groups. As described above, attributes of a group include an attribute of an address registered in the group, as well as an attribute representing a feature of the whole group, such as a group name.

Second Modification of First Exemplary Embodiment

In the first modification of the first exemplary embodiment, the first groups are filtered based on an attribute of a registration target address and the degree of association between the address and each of the filtered groups is set according to history information of the group. However, the degree of association with a group may also be set according to whether or not an address having the same attribute as that of the registration target address is registered in the group.

For example, in a group in which an address having the same attribute as that of the registration target address is registered, an address similar to the registration target address is registered. Therefore, the degree of association between the address and the group is high compared to a group in which no address having the same attribute as that of the registration target address is registered. This is also obvious from, for example, the fact that it is more desirable to register an address of a user who belongs to "sales department" into a group in which an address of another user who belongs to the "sales department" is registered than into a group in which no address of a user who belongs to the "sales department" is registered, such as a group in which only users in a general affairs department are registered.

In this modification, an operation of the image forming apparatus 10 for setting the degree of association with a registration target address and a group according to an attribute included in the registration target address and history information of the group and displaying a group serving as a recommended registration destination based on the set degree of association in the group list 26A on the group selection screen 26, will be explained.

Figure 11:
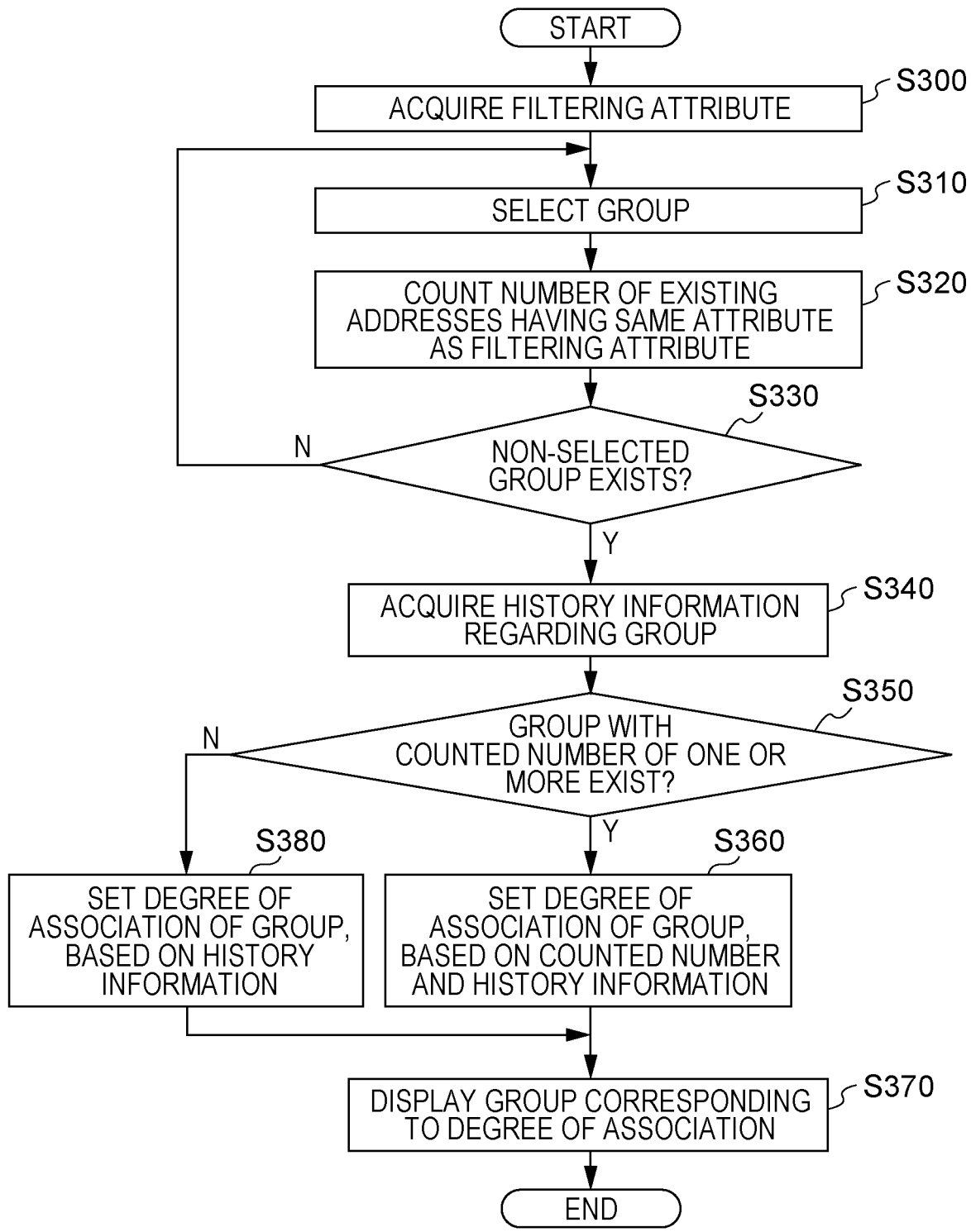
FIG. 11 is a flowchart illustrating an example of the flow of a process for setting the degree of association.

FIG. 11 is a flowchart illustrating an example of the flow of a process for setting the degree of association performed by the CPU 31 after a group suitable for an address, that is, a first group, based on a transmission destination attribute, from among existing groups in step S70 of the process for registering an address illustrated in FIG. 4 and before the process proceeds to step S80. An information processing program that defines the process for setting the degree of association is stored in advance, for example, in the ROM 32 of the image forming apparatus 10. The CPU 31 of the image forming apparatus 10 reads the information processing program stored in the ROM 32 and performs the process for setting the degree of association.

In step S300, the CPU 31 acquires, as a filtering attribute, an attribute different from the attribute used for selection of the first groups (in the example of the process for registering an address illustrated in FIG. 4, the transmission destination attribute) from the registration target address.

In step S310, the CPU 31 selects one of the first groups. The group selected in step S310 is defined as a "selected group".

In step S320, the CPU 31 refers to each of addresses (referred to as "existing addresses") registered in the selected group and counts the number of existing addresses having the same attribute as the filtering attribute acquired in step S300.

In step S330, the CPU 31 determines whether or not there is a non-selected group that is not selected in the processing of step S300 in the first groups. In the case where there is a non-selected group, the process returns to step S310. That is, by performing the processing of steps S310 to S330 in a repetitive manner until all the first groups are selected, the number of existing addresses having the same attribute as the filtering attribute acquired in step S300 is calculated for each of the first groups.

In the case where it is determined in the determination processing of step S330 that all the first groups are selected, the process proceeds to step S340.

In step S340, the CPU 31 acquires, for each of the first groups, history information of a predetermined type from the nonvolatile memory 34.

In step S350, the CPU 31 determines whether or not there is a first group that includes one or more existing addresses having the same attribute as the filtering attribute acquired in step S300. In the case where any one of the first groups includes one or more existing addresses having the same attribute as the filter attribute acquired in step S300, the process proceeds to step S360.

In step S360, the CPU 31 sets, for each of the first groups, the degree of association with the registration target attribute corresponding to the number of existing addresses having the same attribute as the filtering attribute acquired in step S300. Specifically, the CPU 31 sets a higher degree of association with the registration target address for a group in which more existing addresses having the same attribute as the filtering attribute acquired in step S300 are registered.

As described above, a group in which an address having the same attribute as that of the registration target address is registered has a high degree of association with the registration target address compared to a group in which no address having the same attribute as that of the registration target address is registered. For the same reason, it may be said that a group in which more addresses having the same attribute as that of a registration target address are registered is more suitable for the registration target address. Therefore, it is desirable that a higher degree of association with the registration target address be set for a group in which more addresses having the same attribute as that of the registration target address are registered.

Furthermore, the CPU 31 sets the degree of association between each of the first groups and the registration target address, based on the history information acquired in step S340, in accordance with the processing of step S240 in the process for filtering groups illustrated in FIG. 8.

Then, the CPU 31 adds the degree of association set according to the filtering attribute and the degree of association set according to the history information to set the final degree of association between each of the groups and the registration target address. That is, for example, if a group with a degree of association set according to a filtering attribute lower than those of other groups has a degree of association set according to history information higher than those of the other groups, the group may have the highest degree of association with a registration target address than the other groups.

In step S370, the CPU 31 displays groups serving as recommended registration destinations in the group list 26A on the group selection screen 26 such that the set degrees of association with the registration target address are indicated, and the process for setting the degree of association illustrated in FIG. 11 ends.

The mode of display explained in step S250 in the process for filtering groups illustrated in FIG. 8 is used as the mode of display of groups. For display of groups serving as recommended registration destinations in the group list 26A, the CPU 31 limits the number of groups to be presented as recommended registration destinations such that, for example, only the top N groups from the highest degree of association with the target registration destination are displayed, so that groups as the recommended registration destinations are obtained by filtering the first groups.

In contrast, in the case where it is determined in the determination processing of step S350 that no group include an existing address for which the same attribute as the filtering attribute acquired in step S300 is set, the process proceeds to step S380.

In this case, the degree of association of a group is not able to be set according to the filtering attribute. Therefore, as in step S260 in the process for filtering groups illustrated in FIG. 8, the CPU 31 sets, for each of the first groups, the degree of association with the registration target address, based on the history information regarding the group acquired in step S340. Then, in step S370, which has been explained above, groups serving as recommended registration destinations are displayed in the group list 26A on the group selection screen 26 such that the set degree of association with the registration target address is indicated, and the process for setting the degree of association illustrated in FIG. 11 ends.

After the process for setting the degree of association illustrated in FIG. 11 ends, the CPU 31 proceeds to step S80 in the process for registering an address illustrated in FIG. 4 and waits for an instruction from the user via the group selection screen 26.

FIG. 12 is an explanatory diagram for a case where the process for setting the degree of association illustrated in FIG. 11 is performed according to "department=(sales department)" set for a registration target address as a filtering attribute and based on the number of times that a group has been selected as history information to be used for setting the degree of association with the address. In FIG. 12, names of the first groups are listed as group names.

It is assumed that the size relation between the first groups and the size relation regarding the number of times that each of the first groups has been selected are the same as those illustrated in FIGS. 9 and 10. Furthermore, the number of registered addresses having the attribute of "department= (sales department)" in each of the first groups is provided as the "number of addresses". In the example of FIG. 12, a state in which an address including the attribute of "department= (sales department)" is included in each of "E-mail group= (Tokyo)", "E-mail group=(Osaka)", "E-mail group=(Sendai)", "E-mail group=(Kanagawa)", and "E-mail group= (Nagoya)" is illustrated.

The image forming apparatus 10 sets the degree of association based on a filtering attribute for each of groups, for example, by ranking the groups according to the number of addresses having the attribute of "department=(sales department)" registered, in descending order from the group in which the largest number of addresses having the attribute of "department=(sales department)" are registered. In this case, a higher degree of association with the registration target address is set for a group with a smaller value indicating the rank. The rank (degree of association) set based on a filtering attribute for each group is as illustrated in FIG. 12.

Furthermore, the image forming apparatus 10 ranks the groups according to the number of selection times, in descending order from the group that has been selected the most times, so that the degree of association based on the history information is set for each of the groups. In this case, as with setting of the degree of association based on a filtering attribute, a higher degree of association with the registration target address is set for a group with a smaller value indicating the rank. The rank (degree of association) set for each of the groups based on history information is as illustrated in FIG. 12.

Then, the image forming apparatus 10 adds the rank of each of the groups indicating the degree of association based on the filtering attribute and the rank of the group indicating the degree of association based on the history information, and the groups are ranked "first", "second", . . . and "eighth" in order from the group having the smallest total value. In this case, a higher degree of association with the registration target address is set for a group with a smaller value indicating the rank.

Figure 13:
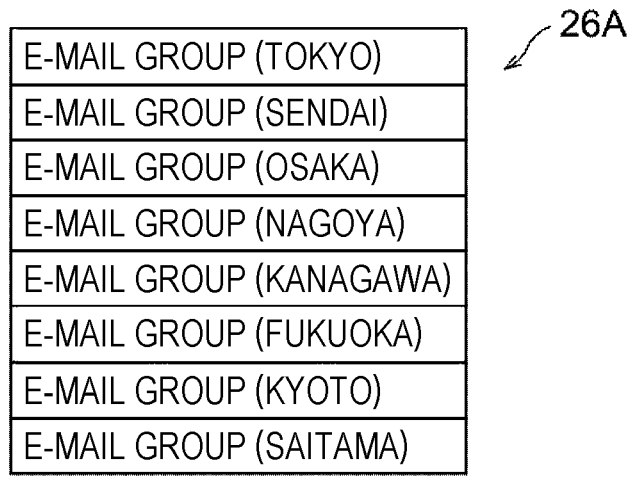
FIG. 13 is a diagram illustrating an example of display of groups serving as recommended registration destinations.

Thus, in the example of the first groups illustrated in FIG. 12, the groups are arranged in the order of "E-mail group= (Tokyo)", "E-mail group=(Sendai)", "E-mail group= (Osaka)", "E-mail group=(Nagoya)", "E-mail group=(Kanagawa)", "E-mail group=(Fukuoka)", "E-mail group= (Kyoto)", and "E-mail group=(Saitama)" from the group having the highest degree of association with the registration target address, as illustrated in FIG. 13. For example, in the case where the top three groups from the highest degree of association with the registration target address are presented as recommended registration destinations for the registration target address, "E-mail group=(Tokyo)", "E-mail group= (Sendai)", and "E-mail group=(Osaka)" are displayed in the group list 26A on the group selection screen 26.

In the process for setting the degree of association illustrated in FIG. 11, an example of setting the degree of association with a registration target address using one filtering attribute has been explained. However, the degree of association with a registration target address may be set using a plurality of filtering attributes. In this case, by setting the degree of association with a registration target address for each of the acquired filtering attributes and adding each of the set degrees of association and the degree of association set based on history information, the final degree of association with the registration target address is set.

FIG. 14 is a diagram illustrating an example of the degree of association of groups set using two filtering attributes and a piece of history information. Specifically, "department= (sales department)" and "birthplace=(Nagoya)" are used as filtering attributes, and in the example of FIG. 14, "sales department" and "Nagoya" correspond to "filtering attribute 1" and "filtering attribute 2", respectively.

In the state in which the number of registered addresses having the attribute of "Nagoya" as the birthplace and the rank of those addresses in each group are as illustrated in the field of "degree of association based on filtering attribute 2" in FIG. 4, by adding the rank of "degree of association based on filtering attribute 1", "degree of association based on history information, and the rank of "degree of association based on filtering attribute 2", the degree of association written in the field of "degree of association based on filtering attributes and history information are obtained.

Figure 15:
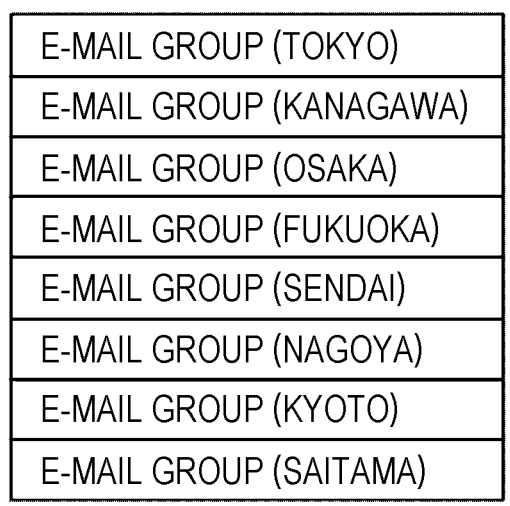
FIG. 15 is a diagram illustrating another example of display of groups serving as recommended registration destinations.

Therefore, in the example of the first groups illustrated in FIG. 14, the groups are arranged in the order of "E-mail group=(Tokyo)", "E-mail group=(Kanagawa)", "E-mail group=(Osaka)", "E-mail group=(Fukuoka)", "E-mail group=(Sendai)", "E-mail group=(Nagoya)", "E-mail group=(Kyoto)", and "E-mail group=(Saitama)" from the group with the highest degree of association with the registration target address, as illustrated in FIG. 15. For example, in the case where the top three groups from the highest degree of association with a registration target address are selected as recommended registration destinations for the registration target address, the "E-mail group= (Tokyo)", "E-mail group=(Kanagawa)", and "E-mail group=(Osaka)" are displayed in the group list 26A on the group selection screen 26, unlike the case where the degree of association with a registration target address is set only using a department as a filtering attribute.

In FIG. 14, an example in which a plurality of filtering attributes are acquired is explained. However, obviously, a plurality of pieces of history information of a group may be acquired, and the degree of association with a registration target address may be set for each of the groups, as in the example of the case where a plurality of filtering attributes are acquired.

As described above, with the image forming apparatus 10 according to this modification, by adding the degree of association with a registration target address set based on an attribute included in the registration target address and the degree of association with the registration target address set based on history information of a group, the final degree of association is be set. Then, the image forming apparatus 10 filters the groups serving as the recommended registration destinations to be presented to a user, in accordance with the final degree of association.

Second Exemplary Embodiment

In the first exemplary embodiment, as an example of an information processing apparatus that presents, for registration of an address, a group having an attribute associated with an attribute of the address is presented as a recommended registration destination for the address, the image forming apparatus 10 has been explained. However, an information processing apparatus according to a second exemplary embodiment is not limited to the image forming apparatus 10.

In the second exemplary embodiment, an operation of the information processing apparatus according to an exemplary embodiment will be explained based on an example in which an address is registered to an SNS by an information apparatus 50 such as a computer or a smartphone in which an application of the SNS operates, will be explained.

Figure 16:
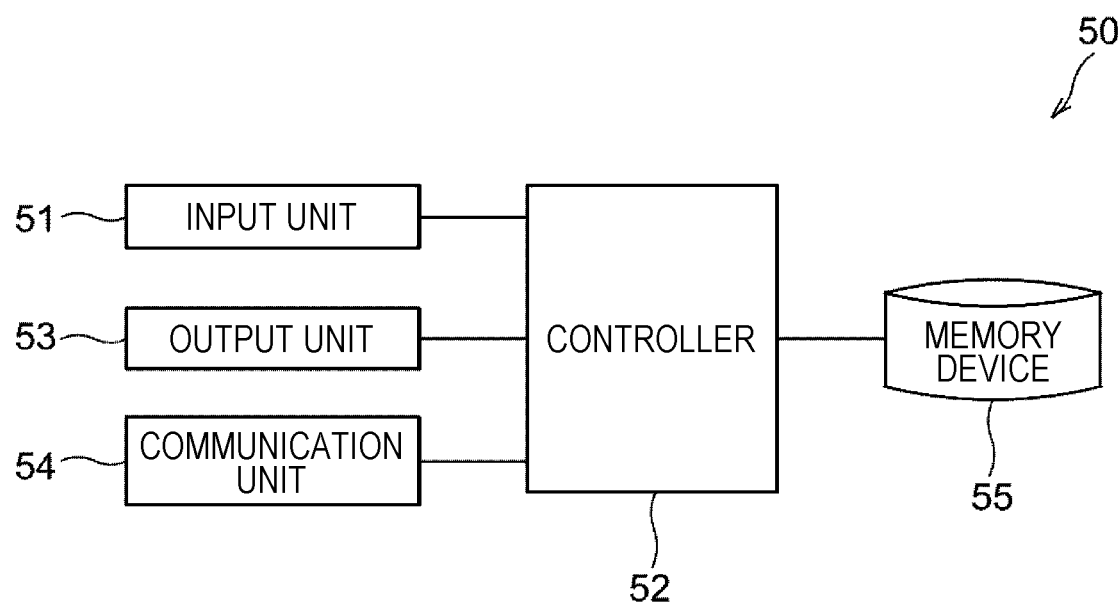
FIG. 16 is a diagram illustrating an example of the functional configuration of an information apparatus.

FIG. 16 is a diagram illustrating an example of the functional configuration of the information apparatus 50. The information apparatus 50 includes functional units including an input unit 51, a controller 52, an output unit 53, and a communication unit 54 and a memory device 55.

The input unit 51 receives an instruction from a user and notifies the controller 52 of the received instruction. The instruction from the user may be, for example, an instruction to start an SNS application, an instruction to register an address for the SNS, or the like.

As explained above, an "address" used in the second exemplary embodiment represents information indicating another person to or from whom information is transmitted or received. Therefore, an SNS account set for each user corresponds to an address of an SNS. An SNS account used in the second exemplary embodiment may include a nickname of a user in an SNS or the like, as well as information for uniquely identifying the user, which is used as a transmission destination for information.

The controller 52 controls other functional units and the memory device 55 included in the information apparatus 50 such that processing according to an instruction from a user received by the input unit 51 is performed.

The output unit 53 outputs various screens for receiving a processing state in the information apparatus 50 and various instructions from a user on a display device, under the control of the controller 52.

The communication unit 54 transmits information input to an SNS by a user to an SNS account specified by the user, under the control of the controller 52. Furthermore, the communication unit 54 receives information from an SNS account of a different user who uses the SNS and notifies the controller 52 of the received information. Information received from another user via the SNS or information posted to the SNS by the user are displayed in an information display region called "timeline" by the controller 52.

The memory device 55 stores, for each group, SNS accounts registered as transmission destinations to which information is transmitted by a user.

An SNS account registered as a transmission destination for information may be, for example, an SNS account of a user who follows so that information is displayed in timeline or an SNS account of a user who is followed. "Follow" represents a mechanism for sharing information posted to an SNS by a specific user. For example, registering a specific user as a friend to the SNS and sharing information among the registered friends is a form of follow. Hereinafter, a user to whom information is transmitted will be represented by a "friend".

Thus, hereinafter, following a user and registering an SNS account of the user to an SNS will be referred to as "registering a friend". SNS accounts of friends registered by a user are collectively stored as a "friend list". A friend list is stored in a memory device of a server that provides the SNS via a communication line. However, the friend list may be stored in the memory device 55 of the information apparatus 50. A friend list of each user is able to be referred to by another user.

To notify a friend of information via an SNS, for example, a user selects the friend as a transmission destination for the information from among registered friends, and the information is transmitted to the friend. In this case, an SNS provides a group function for allowing a user to extract a plurality of friends from a friend list so that information such as a message or an image may be shared at the same time.

As an SNS group, for example, a group name such as "friends having the same hobby" or "classmates" is set by a user.

The functional configuration of the information apparatus 50 is not limited to the example of the functional configuration illustrated in FIG. 16. The information apparatus 50 may include other functional units such as, for example, a photographing unit that photographs an image using a camera, as long as the information apparatus 50 includes an input/output function for providing an interface with a user, a processing function for processing received information, and a communication function for performing data communication via a communication line.

Figure 17:
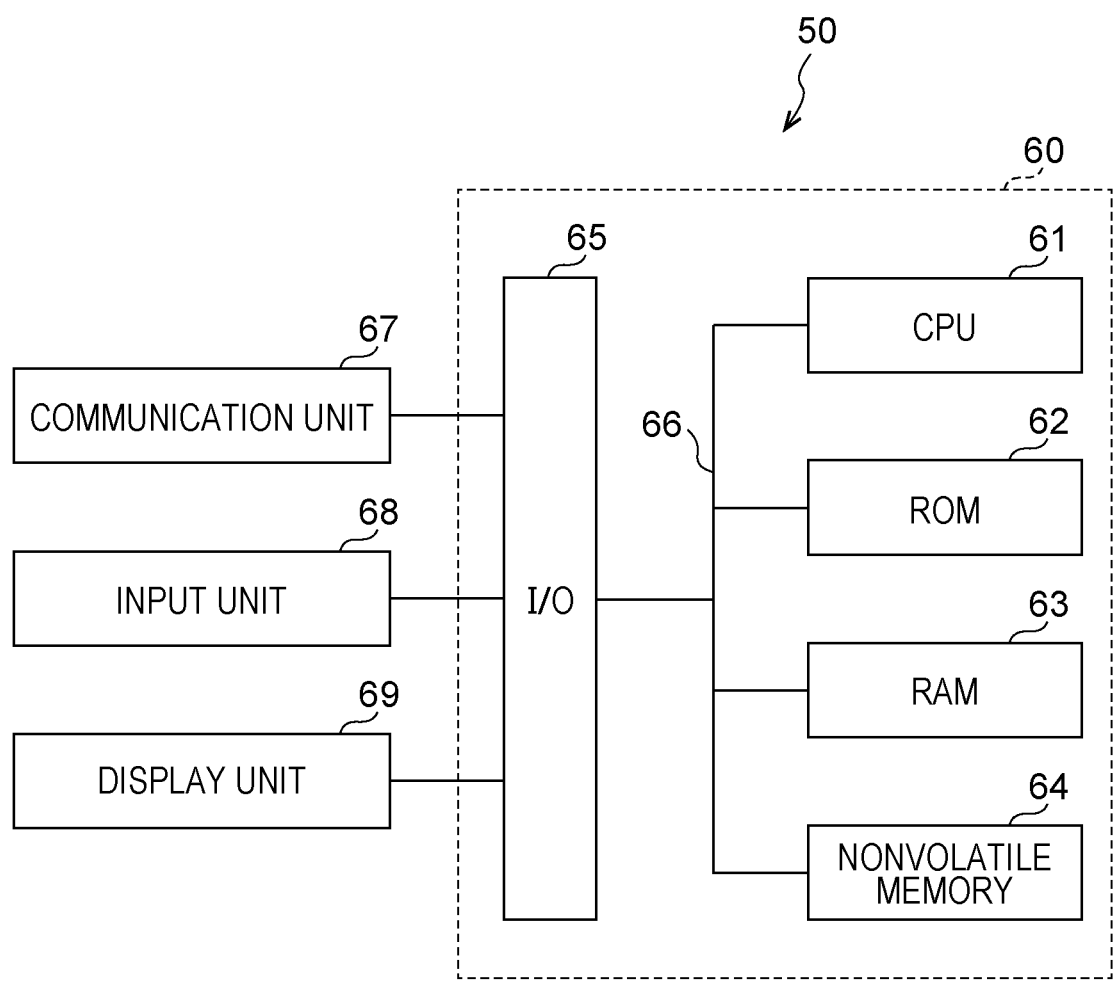
FIG. 17 is a diagram illustrating an example of the configuration of a principal part of an electrical system of an information apparatus.

FIG. 17 is a diagram illustrating an example of the configuration of a principal part of an electrical system in the case where a computer 60 is used as the information apparatus 50.

The computer 60 includes a CPU 61 that manages functional units of the information apparatus 50, a ROM 62 that stores an information processing program for causing the computer 60 to function as functional units of the information apparatus 50, a RAM 63 that is used as a temporary operation region of the CPU 61, a nonvolatile memory 64, and an I/O 65. The CPU 61, the ROM 62, the RAM 63, the nonvolatile memory 64, and the I/O 65 are connected to one another via a bus 66.

For example, a communication unit 67, an input unit 68, and a display unit 69 are connected to the I/O 65.

The communication unit 67 is connected to at last one of a wired communication line and a wireless communication line and is provided with a communication protocol that performs data communication with apparatuses connected to the communication line. Transmission and reception of information to and from a server that provides an SNS is also performed via the communication unit 67.

The input unit 68 is an input device that receives an instruction from a user and notifies the CPU 61 of the received instruction. For example, a button, a touch panel, a keyboard, a mouse, and the like may be used as the input unit 68.

The display unit 69 is a device that displays information processed by the CPU 61. For example, a liquid crystal display, an organic EL display, a projector that projects video to a screen, or the like is used as the display unit 69.

Units connected to the I/O 65 are not necessarily the units illustrated in FIG. 17. For example, a camera unit that photographs an image under the control of the CPU 61 may be connected to the I/O 65.

Next, an operation of the information apparatus 50 for presenting, in a case where registration of a new friend is received on an SNS application, a group suitable as a registration destination for the received friend, will be explained.

Figure 18:
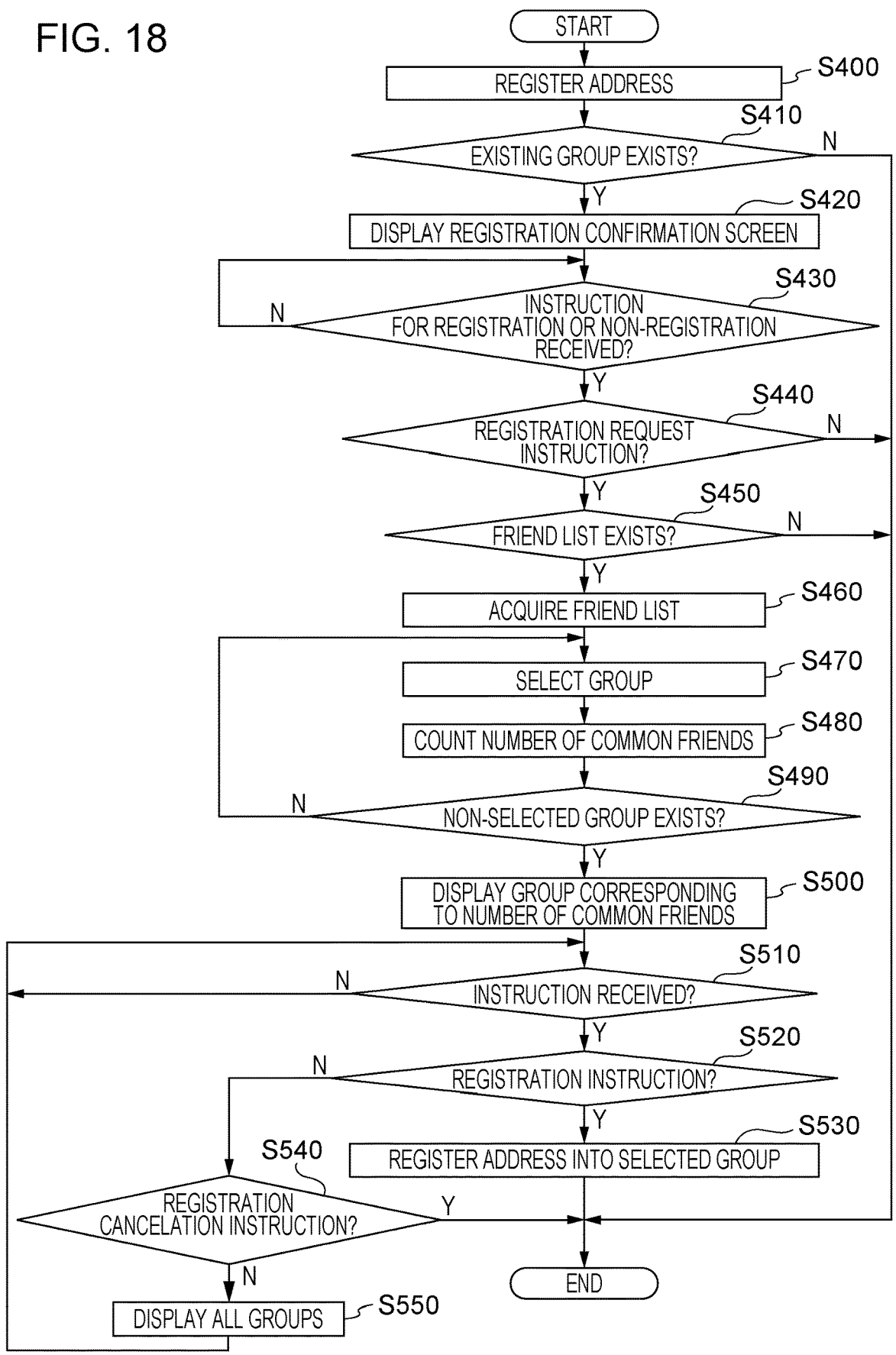
FIG. 18 is a flowchart illustrating an example of the flow of a process for registering a friend in an information apparatus.

FIG. 18 is a flowchart illustrating an example of the flow of a process for registering a friend performed by the CPU 61 in the case where an SNS account of a friend to be newly registered (a registration target friend) is received. An information processing program that defines the process for registering a friend is stored in advance, for example, in the ROM 62 of the information apparatus 50. The CPU 61 of the information apparatus 50 reads the information processing program stored in the ROM 62 and performs the process for registering a friend.

In step S400, the CPU 61 stores a received SNS account of a friend into, for example, the nonvolatile memory 64, and registers the newly received SNS account of the friend into a friend list. In a state in which the SNS account of the friend is simply registered into the friend list, the friend is not registered into any group. The friend list functions as a list of users registered by a user.

To filter friends by selection of a group, the friend needs to be registered into a group. Thus, a group into which the friend is to be registered needs to be created in advance.

Thus, in step S410, the CPU 61 determines whether or not there is at least one group that has already been created.

In the case where there is no group that has already been created, the newly registered friend is not registered into any group, and the process for registering a friend illustrated in FIG. 18 ends.

For example, in the case where a message, such as "Do you wish to create a new group into which a friend is to be registered?", is displayed in the display unit 69 and a user issues an instruction to create a group, the CPU 61 may create a group having a group name according to the instruction from the user. The CPU 61 registers the friend into the created group.

In contrast, in the case where it is determined in the determination processing of step S410 that there is a group that has already been created, the process proceeds to step S420.

In this case, there is a group serving as a registration destination for a friend in the SNS. Therefore, in step S420, the CPU 61 displays the registration confirmation screen 24 illustrated in FIG. 5 on the display unit 69 and confirms with the user as to whether or not the friend is to be registered into a group.

In step S430, the CPU 61 determines whether or not an instruction to register or not to register the friend into a group has been received. In the case where an instruction has not been received, the CPU 61 performs the determination processing of step S430 in a repetitive manner until an instruction has been notified. In contrast, in the case where an instruction has been received, the process proceeds to step S440.

In step S440, the CPU 61 determines whether or not the received instruction is a registration request. In the case where the received instruction is not a registration request, that is, in the case where a registration refusal request is received, the newly registered friend is not registered into any group, and the process for registering a friend illustrated in FIG. 18 ends. In contrast, in the case where the received instruction is a registration request, the process proceeds to step S450.

In the case of the SNS, only by inputting an SNS account of a friend to be registered, registration of the friend is completed. Thus, it is often the case that only an SNS account is set as an attribute of a friend. Also in this exemplary embodiment, a state in which an SNS account is only an attribute of a friend will be explained.

That is, unlike the image forming apparatus 10 according to the first exemplary embodiment, for example, a plurality of transmission destination attributes, such as an e-mail address, a FAX number, and an SNS account, are not set for a friend. Therefore, a group that serves as a recommended registration destination is not able to be presented according to a transmission destination attribute.

Thus, the CPU 61 sets the degree of association between a registration target friend and each group, based on a friend list held by the registration target friend, instead of an SNS account of the registration target friend. A friend list is information associated with a friend, and the friend list includes an SNS account of a user who is registered as a friend of a registration target friend. Therefore, it may be said that the friend list is an example of an associated address that is associated with an address in this exemplary embodiment. The friend list may exclude a friend for whom registration is made pending by the registration target friend, (for example, a friend who is registered unilaterally and displayed in a pending list for friend registration).

Thus, in step S450, the CPU 61 determines whether or not there is a friend list of the registration target friend. In the case where presence of a friend list is not confirmed, for example, a message, such as "The friend was not able to be registered into a group.", is displayed on the display unit 69. The registration target friend is not registered into any group, and the process for registering a friend illustrated in FIG. 18 ends.

In contrast, in the case where there is a friend list, the process proceeds to step S460. In step S460, the CPU 61 acquires the friend list of the registration target friend.

In step S470, the CPU 61 selects any one of existing groups.

In step S480, the CPU 61 refers to the friend list acquired in step S460 and the group selected in step S470 and counts the number of friends registered both in the friend list and the selected group. Hereinafter, a friend registered both in the friend list and the selected group will be referred to as a "common friend". A common friend is an example of a common address. Furthermore, in a case where a friend registered in a group and a part of the friend list are the same or a case where a friend for which registration is not made pending by the registration target friend or a friend to whom a message has been sent at least once and a friend registered in a group are the same, such a friend may be referred to as a "common friend".

In step S490, the CPU 61 determines whether or not a non-selected group that has not been selected in the processing of step S470 exists in the existing group. In the case where there is a non-selected group, the process returns to step S470. That is, by performing the processing of steps S470 to S490 in a repetitive manner until all the existing groups have been selected, the number of common friends included in the friend list is counted for each of the groups.

In step S500, the CPU 61 sets, based on the number of common friends counted for each of the groups, the degree of association between the registration target friend and the group, and displays a group suitable for the registration target friend as a recommended registration destination on the display unit 69.

It may be considered that the degree of probability that the registration target friend has user features indicated by a group name increases as the number of common friends increases. For example, in the case where six common friends are registered in a group of "friends having the same hobby" and two common friends are registered in a group of "classmates", the degree of probability that the registration target friend is a "friend having the same hobby" is higher than the degree of probability that the registration target friend is a "classmate". Thus, the CPU 61 sets the degree of association such that a higher degree of association with the registration target friend is set for a group in which more common friends are registered.

Then, the CPU 61 displays groups serving as recommended registration destinations for the registration target friend in the group list 26A on the group selection screen 26 illustrated in FIG. 6 such that the degree of association between the registration target friend and each of the groups is indicated. Specifically, groups are displayed in order from the top to the bottom of the group list 26A in descending order of the degree of association. That is, a group in which more common friends are registered is displayed in an upper position in the group list 26A. The CPU 61 may limit the number of groups to be displayed in the group list 26A such that only the top N groups with higher degree of association are displayed.

A user is less likely to register a friend into a group in which no common friend is registered in a state in which there is a group in which a common friend is registered. Therefore, the CPU 61 may not display a group in which no common friend is registered in the group list 26A.

After the groups serving as the recommended registration destinations for the registration target friend are displayed on the group selection screen 26, the process proceeds to step S510.

The processing of steps S510, S520, S530, S540, and S550 regarding selection of a group on the group selection screen 26 is the same as the processing of steps S80, S90, S100, S110, and S120 in the process for registering an address illustrated in FIG. 4, respectively. Therefore, explanation for those same processing will be omitted. Accordingly, the process for registering a friend illustrated in FIG. 18 ends.

Figure 19:
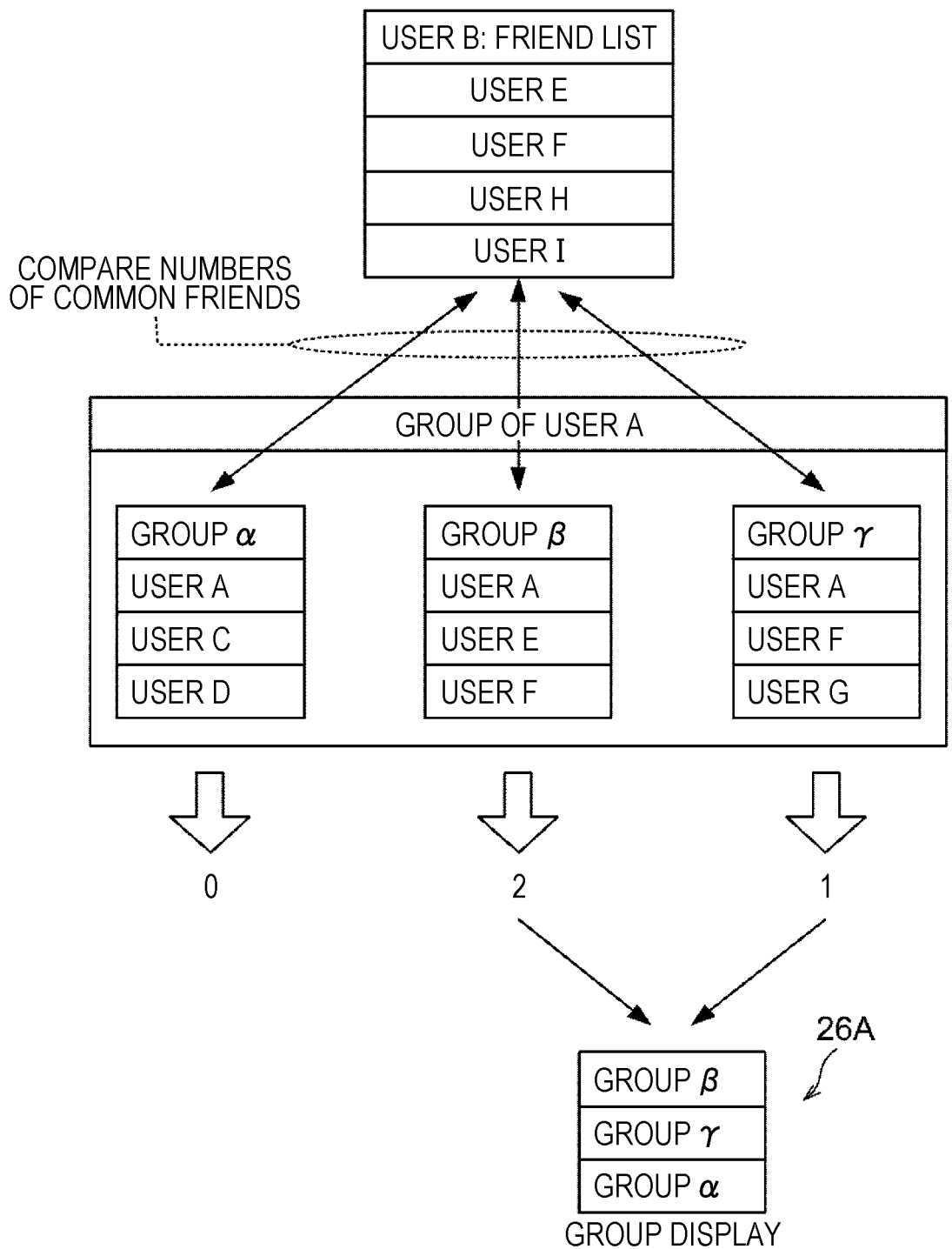
FIG. 19 is a diagram illustrating an example of execution of a process for registering a friend.

FIG. 19 is a diagram illustrating a specific example of the case where the information apparatus 50 performs the process for registering a friend illustrated in FIG. 18. In the example illustrated in FIG. 19, a state in which a user A belongs to three groups: group α; group β; and group γ, and the user A registers a user B as a friend, is illustrated.

In a friend list of the user B, four friends (specifically, SNS accounts of friends): "user E", "user F", "user H", and "user I", are registered. Furthermore, three friends: "user A"; "user C"; and "user D", are registered in the group α, three friends: "user A"; "user E"; and "user F", are registered in the group β, and three friends: "user A"; "user F"; and "user G", are registered in the group γ.

In this case, the number of common friends registered both in the friend list of the user B and the group α is zero, the number of common friends registered both in the friend list of the user B and the group β is two, and the number of common friends registered both in the friend list of the user B and the group γ is one. Therefore, in the group list 26A on the group selection screen 26, groups serving as recommended registration destinations are displayed in the order of "group β", "group γ", and "group α" from the top.

In FIG. 18, a group suitable for a registration target friend is presented based on the degree of association between the registration target friend and each group, which is set based on a friend list of the registration target friend and the number of common friends in the group. However, a method for setting the degree of association between the registration target friend and a group is not limited to this.

The degree of association between a registration target friend and a group may be set according to any scale as long as it quantitatively represents association between the registration target friend and the group.

For example, a group in which more friends are registered may be a group in which a user is more likely to register a friend than other groups. Therefore, a higher degree of association may be set for a group in which more friends are registered.

Furthermore, the information apparatus 50 may present, as a group suitable for a registration target friend, a group that satisfies a predetermined condition that approves association between the registration target friend and the group, without setting the degree of association between the registration target friend and each group.

For example, a group in which a common friend is registered is recognized as having association with a registration target friend compared to a group in which no common friend is registered. Therefore, the information apparatus 50 may present, as a group suitable for the registration target friend, a group in which at least one common friend is registered. According to this example, in the case where the process for registering a friend illustrated in FIG. 19 is performed, "group β" and "group γ" are presented as groups serving as recommended registration destinations.

For example, in the case where no common friend is registered in any group or in the case where no friend is registered in a group, the information apparatus 50 may provide display according to a group name, which is an example of an attribute of a group, such as displaying groups in an alphabetical order according to group names in the group list 26A on the group selection screen 26. Furthermore, the information apparatus 50 may display groups in the group list 26A on the group selection screen 26 in accordance with the order in which the groups were created, the order in which the last friend was registered in the groups, and the order according to the number of transmission and reception times of information to and from a friend included in the group.

As described above, with the information apparatus 50 according to this exemplary embodiment, even if an attribute set for a friend on an SNS is only an SNS account and only a group name is set as an attribute of a group, by comparing a friend registered in the group with a friend included in the friend list of the registration target friend, a group serving as a recommended registration destination for the registration target friend is presented.

First Modification of Second Exemplary Embodiment

In the exemplary embodiment described above, the process for registering a friend has been explained based on the assumption that only an SNS account is set as an attribute of a registration target friend. However, in some SNSs, for example, as an attribute of a friend, an attribute such as age, a workplace, or a school the friend graduated from may be set.

In such an SNS, the information apparatus 50 may filter groups displayed in the group list 26A on the group selection screen 26, based on an attribute of a friend different from an SNS account, that is, based on a filtering attribute.

To filter groups based on a filtering attribute, a process similar to the process for filtering groups illustrated in FIG. 8 may be performed for, for example, groups suitable for a registration target friend selected in the process for registering a friend illustrated in FIG. 18.

Figure 20:
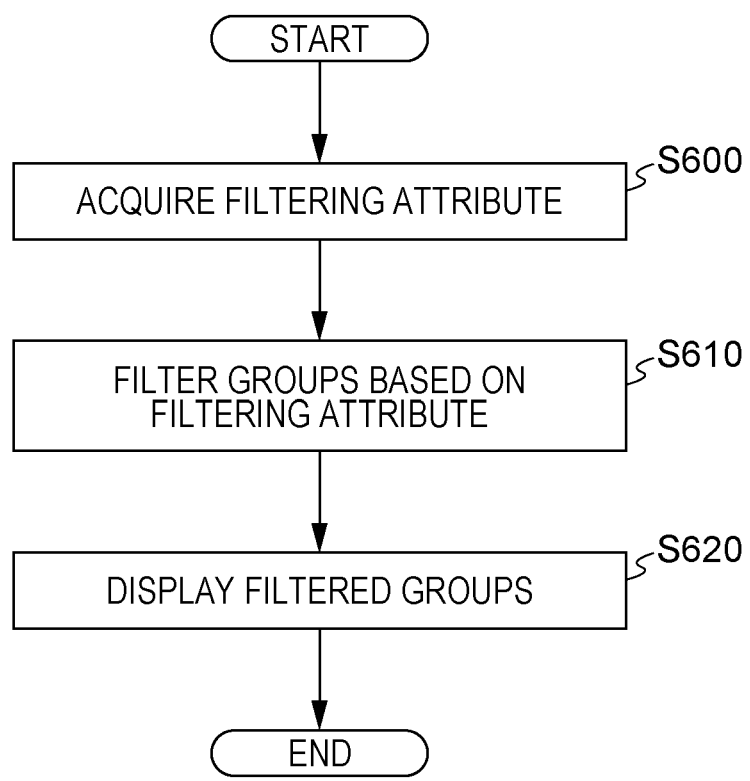
FIG. 20 is a flowchart illustrating an example of the flow of a process for filtering groups in an information apparatus.

FIG. 20 is a flowchart illustrating an example of the flow of a process for filtering groups performed by the CPU 61 after a group suitable for the registration target friend is selected based on a friend list of the registration target friend and the number of common friends in each group in step S00 in the process for registering a friend illustrated in FIG. 18 and before the process proceeds to step S510. An information processing program that defines the process for filtering groups is stored in advance, for example, in the ROM 62 of the information apparatus 50. The CPU 61 of the information apparatus 50 reads the information processing program stored in the ROM 62 and performs the process for filtering groups.

In step S600, the CPU 61 acquires an attribute different from an SNS account from a registration target friend. The attribute acquired in step S600 is a "filtering attribute" for a group. A "first group" used in this modification represents a group selected by the process for registering a friend illustrated in FIG. 18.

In step S610, the CPU 61 filters first groups to extract groups in which a friend for whom the filtering attribute acquired in step S600 is set is registered.

In step S620, the CPU 61 displays the group extracted from the first groups in step S610 in the group list 26A on the group selection screen 26, and the process for filtering groups illustrated in FIG. 20 ends. In the case where the degree of association with a registration target friend is set for a first group, the CPU 61 displays the group in the group list 26A such that the degree of association with the registration target friend is indicated.

In this case, as explained in the first exemplary embodiment, the CPU 61 may filter groups based on a plurality of filtering attributes.

Furthermore, for filtering groups based on a filtering attribute in step S610 in FIG. 20, the CPU 61 may calculate, for each of the first groups, the number of friends having the same attribute as the filtering attribute and set the degree of association such that a higher degree of association with a registration target friend is set for a group in which more friends having the same attribute as the filtering attribute are registered. In the case where the degree of association is set for a group from a plurality of points of view, such as the number of common friends and the number of friends having the same attribute as a filtering attribute, all the degrees of association are added to set the final degree of association with the registration target friend for the group.

As explained in the foregoing exemplary embodiments, an attribute is set for a group in an exemplary embodiment, and the image forming apparatus 10 and the information apparatus 50 determine whether or not there is a group having the same attribute as an attribute of an address or whether or not there is a group having an associated attribute. In the case where there is a group that has the same attribute as an attribute of an address or a group having an associated attribute, the image forming apparatus 10 and the information apparatus 50 present such a group as a group serving as a recommended registration destination for the address.

The present disclosure is not limited to any of the foregoing exemplary embodiments. Various modifications or improvements may be made to the exemplary embodiments without departing from the scope of the present disclosure, and the exemplary embodiments to which modifications or improvements are made are also included in the technical scope of the present disclosure. For example, the order of processing may be changed without departing from the scope of the present disclosure.

In an exemplary embodiment, for example, a mode in which each process is implemented by software has been explained. However, a process equivalent to a flowchart of the process may be implemented in, for example, an application specific integrated circuit (ASIC) and processed by hardware. In this case, compared to a case where each process is implemented by software, the process may be executed at high speed.

Furthermore, in the foregoing exemplary embodiments, a mode in which an information processing program is installed in a ROM has been explained. However, the present disclosure is not limited to this. An information processing program according to an exemplary embodiment may be recorded in a computer readable recording medium and provided. For example, an information processing program according to an exemplary embodiment may be recorded in an optical disc such as a compact disc-read only memory (CD-ROM) or a digital versatile disc-read only memory (DVD-ROM) and provided. Furthermore, an information processing program according to an exemplary embodiment may be recorded in a semiconductor memory such as a universal serial bus (USB) memory or a flash memory and provided. Furthermore, an information processing apparatus such as the image forming apparatus 10 or the information apparatus 50 may acquire, via a communication line, a program from an external apparatus connected to the communication line.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
an input device that receives registration of an address; and
a processor programmed to:
when the input device receives the registration of the address, perform control to acquire history information regarding a group having an attribute of the address, among preset groups, the history information including at least one of a number of existing addresses registered in the group and a number of times that the group has been selected; and
perform control to present the group having the attribute of the address, among preset groups, as a recommended registration destination for the address, in accordance with the acquired history information regarding the group;
when a plurality of groups is associated with the address, perform control to present each of the groups as a recommended registration destination for the address according to priority;
perform control to present a group in which more existing addresses, among existing addresses for each of the groups, are associated with the same attribute as an attribute associated with the address, as the recommended registration destination for the address more preferentially than other groups; and perform control to present a group in which more existing addresses registered for each of the groups are the same as associated addresses that are associated in advance with the address as the recommended registration destination for the address more preferentially than other groups.

2. The information processing apparatus according to claim 1,
wherein an attribute of each of the preset groups is represented by at least one of an attribute provided to the whole group and an attribute of an existing address registered in the group.

3. The information processing apparatus according to claim 2,
wherein the attribute provided to the whole group is a group name of the group.

4. The information processing apparatus according to claim 2,
wherein the processor is programmed to perform control to limit the number of groups presented as recommended registration destinations for the address to a predetermined number of groups.

5. The information processing apparatus according to claim 4,
wherein the processor is programmed to perform control to present groups other than the predetermined number of groups presented as the recommended registration destinations for the address in accordance with an instruction from a user.

6. The information processing apparatus according to claim 1,
wherein the processor is programmed to perform control to limit the number of groups presented as recommended registration destinations for the address to a predetermined number of groups.

7. The information processing apparatus according to claim 6,
wherein the processor is programmed to perform control to present groups other than the predetermined number of groups presented as the recommended registration destinations for the address in accordance with an instruction from a user.

8. The information processing apparatus according to claim 1,
wherein when receiving a registration instruction to register the address into a plurality of groups, the processor is programmed to perform control to register the address into the plurality of groups specified by the registration instruction.

9. A non-transitory computer readable medium storing a program causing a computer to execute a process for information processing, the process comprising:
receiving registration of an address;
performing, when the registration of the address is received, control to acquire history information regarding a group having an attribute of the address, among preset groups, the history information including at least one of a number of existing addresses registered in the group and a number of times that the group has been selected; and performing control to present the group having the attribute of the address, among preset groups, as a recommended registration destination for the address, in accordance with the acquired history information regarding the group;

when a plurality of groups is associated with the address, performing control to present each of the groups as a recommended registration destination for the address according to priority;

performing control to present a group in which more existing addresses, among existing addresses for each of the groups, are associated with the same attribute as an attribute associated with the address, as the recommended registration destination for the address more preferentially than other groups; and performing control to present a group in which more existing addresses registered for each of the groups are the same as associated addresses that are associated in advance with the address as the recommended registration destination for the address more preferentially than other groups.

10. An information processing apparatus comprising:
receiving means for receiving registration of an address;
control means for:
performing, when the receiving means receives the registration of the address, control to acquire history information regarding a group having an attribute of the address, among preset groups, the history information including at least one of a number of existing addresses registered in the group and a number of times that the group has been selected; and performing control to present the group having the attribute of the address, among preset groups, as a recommended registration destination for the address, in accordance with the acquired history information regarding the group;

when a plurality of groups is associated with the address, performing control to present each of the groups as a recommended registration destination for the address according to priority;

performing control to present a group in which more existing addresses, among existing addresses for each of the groups, are associated with the same attribute as an attribute associated with the address, as the recommended registration destination for the address more preferentially than other groups; and performing control to present a group in which more existing addresses registered for each of the groups are the same as associated addresses that are associated in advance with the address as the recommended registration destination for the address more preferentially than other groups.

* * * * *